United States Patent
Baba et al.

(10) Patent No.: US 8,037,538 B2
(45) Date of Patent: Oct. 11, 2011

(54) ACCESS CONTROL PROCESSING METHOD

(75) Inventors: Kensuke Baba, Kanagawa (JP); Yasuyuki Kinoshita, Tokyo (JP); Yoichi Kobori, Kanagawa (JP); Keigo Ihara, Tokyo (JP)

(73) Assignee: Sony Corporation, Tokyo (JP)

(*) Notice: Subject to any disclaimer, the term of this patent is extended or adjusted under 35 U.S.C. 154(b) by 1444 days.

(21) Appl. No.: 10/545,262

(22) PCT Filed: Mar. 5, 2004

(86) PCT No.: PCT/JP2004/002915
§ 371 (c)(1),
(2), (4) Date: Aug. 11, 2005

(87) PCT Pub. No.: WO2004/082205
PCT Pub. Date: Sep. 23, 2004

(65) Prior Publication Data
US 2006/0168253 A1  Jul. 27, 2006

(30) Foreign Application Priority Data
Mar. 10, 2003 (JP) ................................. 2003-063018

(51) Int. Cl.
G06F 7/04  (2006.01)
(52) U.S. Cl. ......................................... 726/27; 709/229
(58) Field of Classification Search .................. 713/153, 713/168, 169, 170, 176, 180, 181; 709/219, 709/229, 225; 726/3, 27, 29
See application file for complete search history.

(56) References Cited

U.S. PATENT DOCUMENTS

| | | | |
|---|---|---|---|
| 7,089,585 B1 * | 8/2006 | Dharmarajan | 726/8 |
| 7,194,621 B1 * | 3/2007 | Nguyen et al. | 713/162 |
| 7,350,076 B1 * | 3/2008 | Young et al. | 713/169 |
| 7,483,945 B2 * | 1/2009 | Blumofe | 709/204 |
| 7,707,424 B2 * | 4/2010 | Axelsson | 713/179 |
| 2002/0180579 A1 * | 12/2002 | Nagaoka et al. | 340/3.1 |
| 2009/0164470 A1 * | 6/2009 | Savage et al. | 707/9 |

FOREIGN PATENT DOCUMENTS
JP  10-313306  11/1998
(Continued)

OTHER PUBLICATIONS

Harkins, D., and Carrel, D., "The Internet Key Exchange (IKE).", RFC 2409 [online], Nov. 1998. Retrieved from the internet: <URL:http://www.faqs.org/rfcs/rfc2409.html>.

*Primary Examiner* — Beemnet Dada
(74) *Attorney, Agent, or Firm* — Oblon, Spivak, McClelland, Maier & Neustadt, L.L.P.

(57) ABSTRACT

The present invention provides a device and a method for accurately and efficiently controlling an access from an external network to an internal network. Both a client device connectable to the external network and an application gateway store shared secret information (Secret) including a client ID: GUID(C) as an ID generated by the client and a server ID: GUID(S) as an ID generated by the application gateway in respective storage units. In response to an access request from the client, the application gateway determines whether the client has appropriate shared secret information (Secret) so as to determine an access right. With this configuration, a right of access from the external network to the internal network, such as a home network, can be efficiently and accurately determined.

49 Claims, 13 Drawing Sheets

FOREIGN PATENT DOCUMENTS

| | | |
|---|---|---|
| JP | 11-39262 | 2/1999 |
| JP | 11-308212 | 11/1999 |
| JP | 2001-008269 | 1/2001 |
| JP | 2001-086113 | 3/2001 |
| JP | 2001-251297 | 9/2001 |
| JP | 2001-265731 | 9/2001 |
| JP | 2002-14872 | 1/2002 |
| JP | 2002-084326 | 3/2002 |
| JP | 2002-094571 | 3/2002 |
| JP | 2002-288054 | 10/2002 |
| WO | 00/51036 | 8/2000 |

* cited by examiner

| CLIENT IDENTIFIER | H(Secret) |
|---|---|
| aabbcc | 854adf77·· |
| bbccdd | 23ad54def·· |
| ·· | ·· |

Fig. 8

| CLIENT IDENTIFIER | SESSION ID |
|---|---|
| aabbcc | 1235477.. |
| bbccdd | 3425564.. |
| .. | .. |

Fig.9

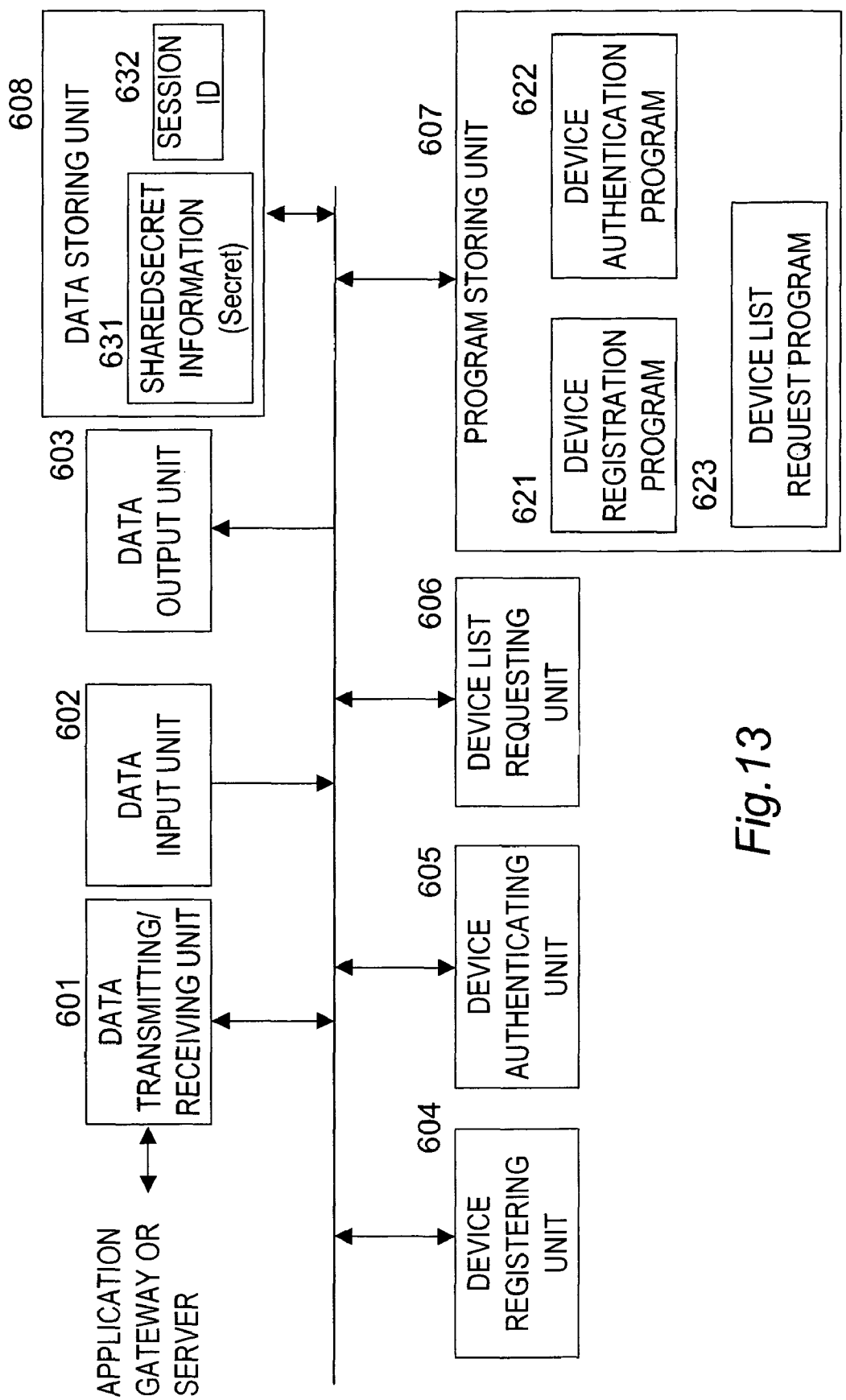

ACCESS CONTROL PROCESSING METHOD

TECHNICAL FIELD

The present invention relates to an information processing device, an access control processing method, an information processing method, and a computer program. More specifically, the present invention relates to an information processing device, an access control processing method, an information processing method, and a computer program in which a right of accessing a device connected to an internal network such as a home network from an external network is determined so that only an authorized client having an access right can access the device and use data.

BACKGROUND ART

With recent popularization of a data communication network, a so-called home network is becoming prevalent in homes. In the home network, home electric appliances, computers, and other peripheral devices are connected to a network so that these devices can communicate with each other. In the home network, devices connected to the network communicate with each other so as to share a data processing function of each device and to transmit/receive content between the devices. Accordingly, the home network provides users with convenience and comfort, and thus will become more and more prevalent in the future.

As a protocol suitable for a configuration of such a home network, a Universal Plug and Play (UPnP) is known. The UPnP can easily establish a network without complicated operations, and allows devices connected to the network to receive a service provided by each of the devices without difficult operations and settings. Further, the UPnP does not depend on an OS (operating system) of a device and thus a device can be easily added advantageously.

In the UPnP, devices connected to the network exchange definition files compatible with an XML (extensible Markup Language) so as to identify each other. The outline of processes according to the UPnP is as follows:

(1) Addressing process of obtaining a self-device ID, such as an IP address;

(2) Discovery process of searching for devices on the network, receiving a response from each of the devices, and obtaining information included in the response, such as the type of device and a function thereof; and (3) Service request process of requesting a service to each device based on the information obtained in the discovery process.

By performing the above-described processes, a service can be provided and received by applying network-connected devices. A device that is newly connected to the network obtains a device ID by performing the above-described addressing process and obtains information about other devices connected to the network by performing the discovery process, so that the device can request a service to another device based on the obtained information.

In this type of network, however, measures against unauthorized accesses need to be considered. Devices in a home network, for example, a server or the like, often store content requiring management of a copy right, such as private content or paid content.

Content stored in a server of the home network can be accessed from devices connected to the network. For example, the content can be obtained by a device that has performed the above-described UPnP connection, which is a simple device connecting configuration. When the content is movie data or music data, a user can see a movie or listen to the music by connecting a television set or a player or the like to the network.

An access from a device of a user having a right to use the content may be permitted. However, in the above-described network configuration, even a user who does not have a right to use the content can easily enter the network. For example, in a network configured of a wireless LAN, an unauthorized user may illegally enter the network to access a server in the home from the outside or a neighborhood by using a communication device so as to steal content. Such a configuration allowing an unauthorized access causes leakage of secrets and also provokes a serious problem in terms of management of copy rights of content.

In order to eliminate the above-described unauthorized accesses, the following configuration has been suggested. That is, a server is allowed to hold a list of clients having a right to access the server. When the server receives an access request from a client, the server performs verification by using the list so as to eliminate an unauthorized access.

For example, a MAC (Media Access Control) address filtering has been known. In the MAC address filtering, a MAC address as a physical address unique to a network-connected device is set in an access-permitted device list. In the MAC address filtering, MAC addresses permitted to have an access right are registered in advance in a router or a gateway for isolating an internal network (subnet), such as a home network, from an external network. Then, a MAC address of a received packet is compared to the registered MAC address so as to refuse an access from a device having an unregistered MAC address. This technique is disclosed in, for example, Patent Document 1 (Japanese Unexamined Patent Application Publication No. 10-271154).

However, in order to register MAC addresses to limit accesses, MAC addresses of all devices connected to the network must be obtained. Further, an operator must input the obtained MAC addresses (48 bits) of the all devices to create a list. This process can be performed under a predetermined administrator when a secure environment needs to be established in a specific company or a group. However, it is not practical to request a general user to create and store a MAC list in a home network environment established in a home.

In a home network, addition of a new device often occurs. Therefore, if a user has to obtain and register a MAC address of an added device every time a device is added, ease of establishing a network is inhibited.

On the other hand, a network configuration including a personal computer and home electric appliances has being established in more homes and a so-called ubiquitous environment in which any device can access the network has being established. At the same time, an external communication device can easily invade a wireless LAN due to popularization of the wireless LAN. In such a network environment, unauthorized accesses to network-connected devices are more likely to occur, and a possibility that secret information is stolen by an unauthorized access and that content is illegally read is becoming higher and higher. Under these circumstances, demand for easily realizing an appropriate access control configuration without putting a load on users has grown.

DISCLOSURE OF INVENTION

The present invention has been made in view of the above-described problems and an object of the present invention is to provide an information processing device, an access control processing method, an information processing method, and a computer program enabling a determination of a right of an access from an external network to a device connected to an internal network, such as a home network, so as to allow only a client having a proper right to access the device connected to the internal network and to use data.

According to a first aspect of the present invention, provided is an information processing device performing an access control process. The information processing device includes: a data transmitting/receiving unit which transmits/receives data to/from a client serving as an access requesting device; a storage unit which stores secret information (Secret) shared with the client having a proper access right, the shared secret information including a client ID as an ID generated by the client and a server ID as an ID generated by the information processing device; and a device authenticating unit which determines whether the client has an access right by determining whether the client has the shared secret information (Secret) in response to an access request from the client.

In an embodiment of the information processing device of the present invention, the storage unit is configured to store the shared secret information (Secret) including the client ID and the server ID as encrypted data encrypted by identification information unique to hardware of the information processing device, that is, a hardware unique ID (Huid(S)).

In an embodiment of the information processing device of the present invention, the device authenticating unit is configured to receive a hash value of a self-generated random number (Nonce2) and the shared secret information (Secret) held by the client from the client, the hash value being regarded as a client authentication value (ClientAuth); calculate a hash value of the random number (Nonce2) and the shared secret information (Secret) stored in the storage unit; compare the received hash value with the calculated hash value; and determine that the client has an access right if the both hash values match.

In an embodiment of the information processing device of the present invention, the device authenticating unit is configured to receive a random number (Nonce1) generated by the client; calculate a hash value of the received random number (Nonce1) and the shared secret information (Secret) stored in the storage unit, the hash value being regarded as a server authentication value (ServerAuth); and transmit the server authentication value to the client.

In an embodiment of the information processing device of the present invention, the information processing device is configured to have a client identifying table in which client identifiers are associated with hash values of the shared secret information (Secret), and wherein the device authenticating unit is configured to identify the client by searching the client identifying table based on a hash value of the shared secret information (Secret) received from the client.

In an embodiment of the information processing device of the present invention, the information processing device is configured to have a client session ID table in which client identifiers are associated with session IDs serving as connection identification information with the client and to identify the client by searching the client session ID table based on a session ID received from the client.

In an embodiment of the information processing device of the present invention, the device authenticating unit is configured to perform an encryption key sharing process applied to an encrypted communication with the client before starting an access right determining process for the client by determining whether the client has the shared secret information (Secret), so as to determine whether the client has the shared secret information (Secret) by encrypting transmitted/received data based on the encryption key.

In an embodiment of the information processing device of the present invention, the encryption key sharing process is an SSL (Secure Socket Layer) handshake process.

In an embodiment of the information processing device of the present invention, the information processing device further includes a device registering unit which performs a process of sharing the shared secret information (Secret) including the client ID and the server ID with the client. The device registering unit is configured to perform an ID exchange process of exchanging the client ID as an ID generated by the client and the server ID as an ID generated by the information processing device in a form of encrypted data through a network.

In an embodiment of the information processing device of the present invention, the device registering unit is configured to perform a password authentication process in order to perform the ID exchange process.

In an embodiment of the information processing device of the present invention, each of the client ID and the server ID included in the shared secret information (Secret) has a global uniqueness.

In an embodiment of the information processing device of the present invention, the information processing device has a function of an application gateway positioned between an internal network inside a local area and an external network outside the local area.

In an embodiment of the information processing device of the present invention, the information processing device has a function of a reverse proxy server positioned between an internal network inside a local area and an external network outside the local area.

According to a second aspect of the present invention, provided is an information processing device serving as a client performing an access request process. The information processing device includes: a data transmitting/receiving unit which transmits/receives data; a storage unit which stores secret information (Secret) shared with an application gateway, the shared secret information including a client ID as an ID generated by the client and a server ID as an ID generated by the application gateway; and a device authenticating unit which determines whether the application gateway is authorized by determining whether the application gateway has the shared secret information (Secret).

In an embodiment of the information processing device of the present invention, the storage unit is configured to store the shared secret information (Secret) including the client ID and the server ID as encrypted data encrypted by identification information unique to hardware of the information processing device, that is, a hardware unique ID (Huid(C)).

In an embodiment of the information processing device of the present invention, the device authenticating unit is configured to receive a hash value of a self-generated random number (Nonce1) and the shared secret information (Secret) held by the application gateway from the application gateway, the hash value being regarded as a server (application gateway) authentication value (ServerAuth); calculate a hash value of the random number (Nonce1) and the shared secret information (Secret) stored in the storage unit; compare the received hash value with the calculated hash value; and determine that the application gateway is authorized if the both hash values match.

In an embodiment of the information processing device of the present invention, the device authenticating unit is configured to receive a random number (Nonce2) generated by the application gateway; calculate a hash value of the received random number (Nonce2) and the shared secret information (Secret) stored in the storage unit, the hash value being regarded as a client authentication value (ClientAuth); and transmit the client authentication value to the application gateway.

In an embodiment of the information processing device of the present invention, the device authenticating unit is configured to perform an encryption key sharing process applied to an encrypted communication with the application gateway before starting a process of determining whether the application gateway is authorized by determining whether the application gateway has the shared secret information (Secret), so as to determine whether the application gateway has the shared secret information (Secret) by encrypting transmitted/received data based on the encryption key.

In an embodiment of the information processing device of the present invention, the encryption key sharing process is an SSL (Secure Socket Layer) handshake process.

In an embodiment of the information processing device of the present invention, the information processing device further includes a device registering unit which performs a process of sharing the shared secret information (Secret) including the client ID and the server ID with the application gateway. The device registering unit is configured to perform an ID exchange process of exchanging the client ID as an ID generated by the client and the server ID as an ID generated by the information processing device in a form of encrypted data through a network.

In an embodiment of the information processing device of the present invention, the device registering unit is configured to perform a password authentication process in order to perform the ID exchange process.

In an embodiment of the information processing device of the present invention, each of the client ID and the server ID included in the shared secret information (Secret) has a global uniqueness.

According to a third aspect of the present invention, provided is a server-client system including a server performing an access control process and a client performing an access request process to the server. The server includes: a server data transmitting/receiving unit which transmits/receives data; a server storage unit which stores secret information (Secret) shared with the client having a proper access right, the shared secret information including a client ID as an ID generated by the client and a server ID as an ID generated by the information processing device; and a server device authenticating unit which determines whether the client has an access right by determining whether the client has the shared secret information (Secret) in response to an access request from the client. The client includes: a client data transmitting/receiving unit which transmits/receives data; a client storage unit which stores secret information (Secret) shared with an application gateway, the shared secret information including a client ID as an ID generated by the client and a server ID as an ID generated by the application gateway; and a client device authenticating unit which determines whether the application gateway is authorized by determining whether the application gateway has the shared secret information (Secret).

In an embodiment of the server-client system of the present invention, the server storage unit is configured to store the shared secret information (Secret) including the client ID and the server ID as encrypted data encrypted by identification information unique to hardware of the server, that is, a hardware unique ID (Huid(S)).

In an embodiment of the server-client system of the present invention, the server device authenticating unit is configured to receive a hash value of a self-generated random number (Nonce2) and the shared secret information (Secret) held by the client from the client, the hash value being regarded as a client authentication value (ClientAuth); calculate a hash value of the random number (Nonce2) and the shared secret information (Secret) stored in the server storage unit; compare the received hash value with the calculated hash value; and determine that the client has an access right if the both hash values match.

In an embodiment of the server-client system of the present invention, the server device authenticating unit is configured to receive a random number (Nonce1) generated by the client; calculate a hash value of the received random number (Nonce1) and the shared secret information (Secret) stored in the server storage unit, the hash value being regarded as a server authentication value (ServerAuth); and transmit the server authentication value to the client.

In an embodiment of the server-client system of the present invention, the client storage unit is configured to store the shared secret information (Secret) including the client ID and the server ID as encrypted data encrypted by identification information unique to hardware of the client, that is, a hardware unique ID (Huid(C)).

In an embodiment of the server-client system of the present invention, the client device authenticating unit is configured to receive a hash value of a self-generated random number (Nonce1) and the shared secret information (Secret) held by the application gateway from the application gateway, the hash value being regarded as a server (application gateway) authentication value (ServerAuth); calculate a hash value of the random number (Nonce1) and the shared secret information (Secret) stored in the client storage unit; compare the received hash value with the calculated hash value; and determine that the application gateway is authorized if the both hash values match.

In an embodiment of the server-client system of the present invention, the client device authenticating unit is configured to receive a random number (Nonce2) generated by the application gateway; calculate a hash value of the received random number (Nonce2) and the shared secret information (Secret) stored in the client storage unit, the hash value being regarded as a client authentication value (ClientAuth); and transmit the client authentication value to the application gateway.

According to a fourth aspect of the present invention, provided is an access control processing method in an information processing device. The access control processing method includes: an access request receiving step of receiving an access request from a client; and a device authenticating step of determining whether the client has an access right by determining whether the client has shared secret information (Secret) including a client ID as an ID generated by the client and a server ID as an ID generated by the information processing device.

In an embodiment of the access control processing method of the present invention, the device authenticating step includes: a step of receiving a hash value of a self-generated random number (Nonce2) and the shared secret information (Secret) held by the client from the client, the hash value being regarded as a client authentication value (ClientAuth); a step of calculating a hash value of the random number (Nonce2) and the shared secret information (Secret) stored in a storage unit and comparing the received hash value with the calculated hash value; and a step of determining that the client has an access right if the both hash values match.

In an embodiment of the access control processing method of the present invention, the access control processing method further includes: a step of receiving a random number (Nonce1) generated by the client; calculating a hash value of the received random number (Nonce1) and the shared secret information (Secret) stored in a storage unit, the hash value being regarded as a server authentication value (ServerAuth); and transmitting the server authentication value to the client.

In an embodiment of the access control processing method of the present invention, the access control processing method further includes: a step of performing a table search based on the hash value of the shared secret information (Secret) received from the client by using a client identifying table in which client identifiers are associated with hash values of the shared secret information (Secret), so as to identify the client.

In an embodiment of the access control processing method of the present invention, the access control processing method further includes: a step of performing a table search based on a session ID received from the client by using a client session ID table in which client identifiers are associated with session IDs serving as connection identification information with the client, so as to identify the client.

In an embodiment of the access control processing method of the present invention, an encryption key sharing process applied to an encrypted communication with the client is performed before starting an access right determining process for the client by determining whether the client has the shared secret information (Secret), and a process of determining whether the client has the shared secret information (Secret) is performed by encrypting transmitted/received data based on the encryption key.

In an embodiment of the access control processing method of the present invention, the encryption key sharing process is an SSL (Secure Socket Layer) handshake process.

In an embodiment of the access control processing method of the present invention, the access control processing method further includes: a device registering step of performing a process of sharing the shared secret information (Secret) including the client ID and the server ID with the client. The device registering step includes a step of performing an ID exchange process of exchanging the client ID as an ID generated by the client and the server ID as an ID generated by the information processing device in a form of encrypted data through a network.

In an embodiment of the access control processing method of the present invention, the device registering step includes a step of performing a password authentication process in order to perform the ID exchange process.

In an embodiment of the access control processing method of the present invention, each of the client ID and the server ID included in the shared secret information (Secret) has a global uniqueness.

According to a fifth aspect of the present invention, provided is an information processing method in a client performing an access request process. The information processing method includes: a step of accessing an application gateway; and a device authenticating step of determining whether the application gateway is authorized by determining whether the application gateway has shared secret information (Secret) including a client ID as an ID generated by the client and a server ID as an ID generated by the application gateway.

In an embodiment of the information processing method of the present invention, the device authenticating step includes: a step of receiving a hash value of a self-generated random number (Nonce1) and the shared secret information (Secret) held by the application gateway from the application gateway, the hash value being regarded as a server (application gateway) authentication value (ServerAuth); a step of calculating a hash value of the random number (Nonce1) and the shared secret information (Secret) stored in a storage unit and comparing the received hash value with the calculated hash value; and a step of determining that the application gateway is authorized if the both hash values match.

In an embodiment of the information processing method of the present invention, the device authenticating step performs a process of receiving a random number (Nonce2) generated by the application gateway; calculating a hash value of the received random number (Nonce2) and the shared secret information (Secret) stored in a storage unit, the hash value being regarded as a client authentication value (ClientAuth); and transmitting the client authentication value to the application gateway.

In an embodiment of the information processing method of the present invention, an encryption key sharing process applied to an encrypted communication with the application gateway is performed before starting a process of determining whether the application gateway is authorized by determining whether the application gateway has the shared secret information (Secret); and a process of determining whether the application gateway has the shared secret information (Secret) is performed by encrypting transmitted/received data based on the encryption key.

In an embodiment of the information processing method of the present invention, the encryption key sharing process is an SSL (Secure Socket Layer) handshake process.

In an embodiment of the information processing method of the present invention, the information processing method further includes: a device registering step of performing a process of sharing the shared secret information (Secret) including the client ID and the server ID with the application gateway. The device registering step performs an ID exchange process of exchanging the client ID as an ID generated by the client and the server ID as an ID generated by the information processing device in a form of encrypted data through a network.

In an embodiment of the information processing method of the present invention, the device registering step performs a password authentication process in order to perform the ID exchange process.

In an embodiment of the information processing method of the present invention, each of the client ID and the server ID included in the shared secret information (Secret) has a global uniqueness.

According to a sixth aspect of the present invention, provided is a computer program performing an access control process in an information processing device. The computer program includes: an access request receiving step of receiving an access request from a client; and a device authenticating step of determining whether the client has an access right by determining whether the client has shared secret information (Secret) including a client ID as an ID generated by the client and a server ID as an ID generated by the information processing device.

According to a seventh aspect of the present invention, provided is a computer program performing information processing in a client performing an access request process. The computer program includes: a step of accessing an application gateway; and a device authenticating step of determining whether the application gateway is authorized by determining whether the application gateway has shared secret information (Secret) including a client ID as an ID generated by the client and a server ID as an ID generated by the application gateway.

According to the configuration of the present invention, both the client device connectable to the external network and the application gateway store the shared secret information (Secret) including the ID generated by the client, the client ID: GUID(C), and the ID generated by the application gateway, the server ID: GUID(S), in their storage units. When the application gateway receives an access request from the client, the application gateway determines whether the client has proper shared secret information (Secret) in order to determine whether the client has an access right. With this configuration, a right determining process can be efficiently and appropriately performed on an access from the external network to the internal network in a local area, such as a home network.

Further, in the configuration of the present invention, both the client device and the application gateway mutually determine whether the other side holds the shared secret information (Secret), that is, the client ID: GUID(C) and the server ID: GUID(S), so as to verify the right of each other. Therefore, an access to the internal network is refused if any one of them is unauthorized, so that security against external accesses to the internal network can be enhanced.

Further, according to the configuration of the present invention, the application gateway holds the client session ID table in which client identifiers are associated with session IDs serving as connection identification information with clients. With this configuration, each client can be identified by the session ID even when a plurality of clients access from the external network.

Further, according to the configuration of the present invention, an encryption key sharing process applied to encrypted communication with the client is performed before starting an access right determining process of determining whether the client has the shared secret information (Secret). That is, whether the client has the shared secret information (Secret) is determined by encrypting transmitted/received data based on an encryption key. With this configuration, a high-security access right determining process can be realized even in a communication through a network having a risk of tapping, such as the Internet.

Further, according to the configuration of the present invention, in a device registration process of performing a process of sharing the client ID: GUID(C) and the server ID: GUID(S), a password is authenticated before exchanging IDs and the IDs are exchanged through the network after encrypting the IDs. With this configuration, the device registration process is securely performed in a specific closed network, and thus an improper device registration can be prevented.

The computer program of the present invention can be provided to a general-purpose computer system capable of performing various program codes through a computer-readable storage medium or communication medium, for example, a storage medium such as a CD, an FD, or an MO, or a communication medium such as a network. Processes according to the program are realized on the computer system by providing the program in a computer-readable form.

Further objects, features, and advantages of the present invention will become apparent from the following description of an exemplary embodiment with reference to the attached drawings. In this description, a system is a logical group of a plurality of devices, and the devices having different configurations do not always placed in the same casing.

BRIEF DESCRIPTION OF THE DRAWINGS

FIG. 8 shows an example of a configuration of a client identifying table generated by an application gateway.

FIG. 9 shows an example of a configuration of a client session ID table generated by the application gateway.

FIG. 13 is a block diagram illustrating a functional configuration of the client.

BEST MODE FOR CARRYING OUT THE INVENTION

Hereinafter, an information processing device, an access control processing method, an information processing method, and a computer program of the present invention will be described in detail with reference to the drawings.

[Overview of the System]

Figure 1:
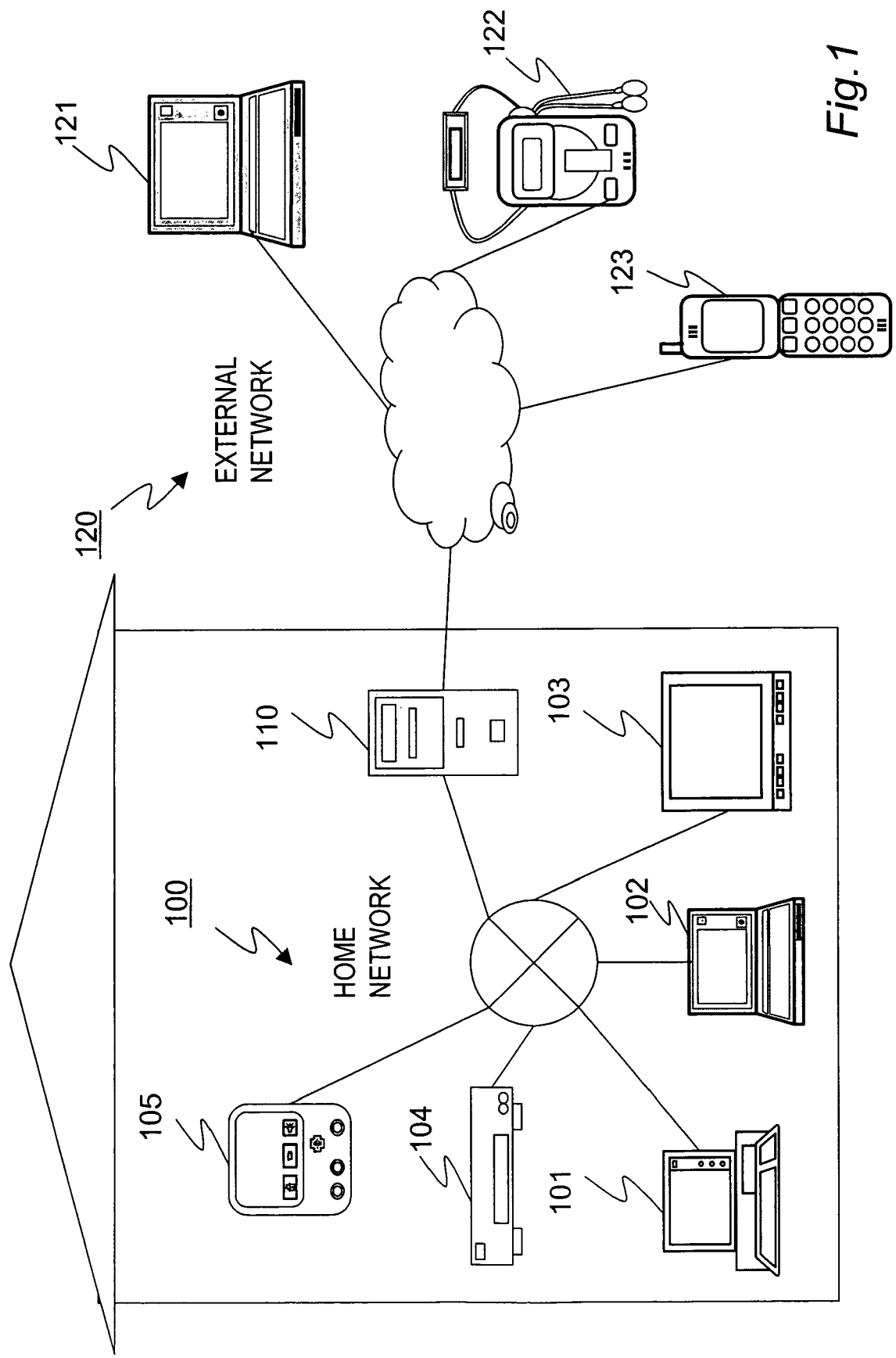
FIG. 1 shows an example of a network configuration to which the present invention can be applied.

First, an example of a network configuration to which the present invention can be applied is described with reference to FIG. 1. FIG. 1 shows a local area network or an internal network, such as a home network 100 established in a home of a specific user. Various information processing devices, such as personal computers (PCs) 101 and 102, a hard disk recorder 103, a TV 104, and a PDA 105, transmit/receive data through the home network 100.

For example, the PC 101 or 102 or the hard disk recorder 103 functions as a content providing server and the TV 104 and the PDA 105 function as clients. The clients obtain content stored in the server through the network and output the content through a display or a speaker of the clients.

The home network 100 is a wired or wireless network, and each device connected thereto transmits/receives a communication packet of an Ethernet® frame or the like through the network. That is, each client performs a data processing request to the server by transmitting an Ethernet frame whose data portion stores processing request information to the server. The server performs data processing in response to the processing request frame, stores result data as data processing result in a data portion of a communication packet as necessary, and transmits the communication packet to each client.

Devices compatible with the UPnP (Universal Plug and Play) are used as network-connected devices, and thus a device can be easily added or removed to/from the network. A device that is newly connected to the network performs the following processes so as to receive services applying the devices connected to the network:

(1) Addressing process of obtaining a self-device ID, such as an IP address;

(2) Discovery process of searching for devices on the network, receiving a response from each of the devices, and obtaining information included in the response, such as the type of device and a function thereof; and (3) Service request process of requesting a service to each device based on the information obtained in the discovery process.

In FIG. 1, the home network 100 connects to an external network 120, such as the Internet. Various information processing devices, such as a PC 121, a mobile phone 122, and a portable playback device 123, connect to the external network 120. The information processing devices in the home network 100 and the information processing devices in the external network 120 can communicate with each other through the external network 120 and the home network 100.

An application gateway 110 having a firewall function of limiting accesses from devices connected to the external network 120 is provided between the external network 120 and the internal network constituted of the home network 100. The application gateway checks a communication packet in an application layer upon receiving an access request from the external network so as to perform filtering.

The application gateway 110 also functions as a proxy server of the information processing devices connected to the home network 100. In other words, the application gateway 110 also has a reverse proxy server function.

As described above, the application gateway 110 is an application gateway positioned between the internal network in a local area, such as the home network, and the external network outside the local area, and has a function of a reverse proxy server.

The various information processing devices connected to the external network 120, such as the PC 121, the mobile phone 122, and the portable playback device 123, access a server in the home network 100, for example, the PC 101, the PC 102, or the hard disk recorder 103, through the application gateway 110, and obtain content stored in these devices. Accordingly, the content can be output in the PC 121, the mobile terminal 122, and the playback device 123.

However, allowing an unspecified client to obtain the content is not preferable in view of the copy right of the content and leakage of secrets. Therefore, the application gateway 110 provided between the external network 120 and the home network 100 performs an access right determining process for each access from an external device, and permits an access only when the external device has an access right. The details of this process are described later.

Now, an example of a hardware configuration of each information processing device shown in FIG. 1, that is, the server, the client, and the application gateway, is described with reference to FIG. 2.

A CPU (Central Processing Unit) 201 performs various processes in accordance with a program stored in a ROM (Read only Memory) 202 or a HDD (Hard Disk Drive) 204 and functions as data processing means or communication control processing means. A RAM (Random Access Memory) 203 stores a program performed by the CPU 201 and data as necessary. The CPU 201, the ROM 202, the RAM 203, and the HDD 204 are connected to each other through a bus 205.

The bus 205 connects to an input/output interface 206, and the input/output interface 206 connects to an input unit 207 including a keyboard, a switch, a button, or a mouse operated by a user; and an output unit 208 including an LCD, a CRT, or a speaker for presenting various information to a user. Also, the input/output interface 206 connects to a communication unit 209 functioning as data transmitting/receiving means; and a drive 210 to which a removable recording medium 211, such as a magnetic disk, an optical disk, a magneto-optical disk, or a semiconductor memory, can be loaded and which reads/writes data from/into the removable recording medium 211.

Figure 2:
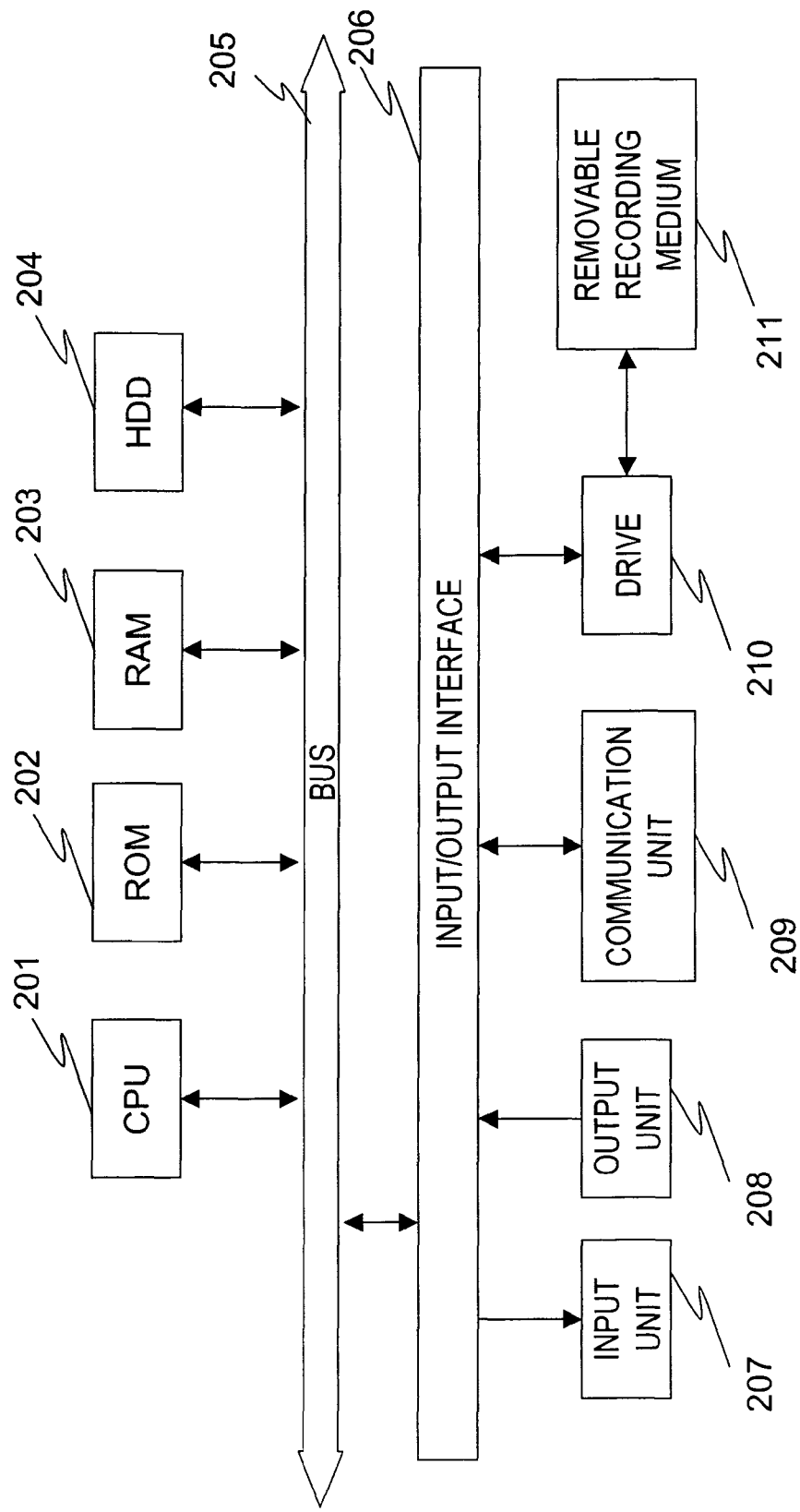
FIG. 2 illustrates an example of a configuration of a device connected to a network.

The configuration shown in FIG. 2 shows a configuration of a typical PC serving as an example of the network-connected devices shown in FIG. 1. The network-connected devices are not limited to PCs, but may include mobile communication terminals, such as the mobile phone and the PDA shown in FIG. 1, and other various electronic devices and information processing devices. Each of the devices can have a hardware configuration unique to the device and performs processes in accordance with the hardware configuration.

[Content Obtaining Process Performed by a Client in the Home Network]

Among the various information processing devices connected to the home network 100 shown in FIG. 1, such as the PCs 101 and 102, the hard disk recorder 103, the TV 104, and the PDA 105, a client can obtain content from a server by performing communication in accordance with the above-mentioned UPnP protocol.

Figure 3:
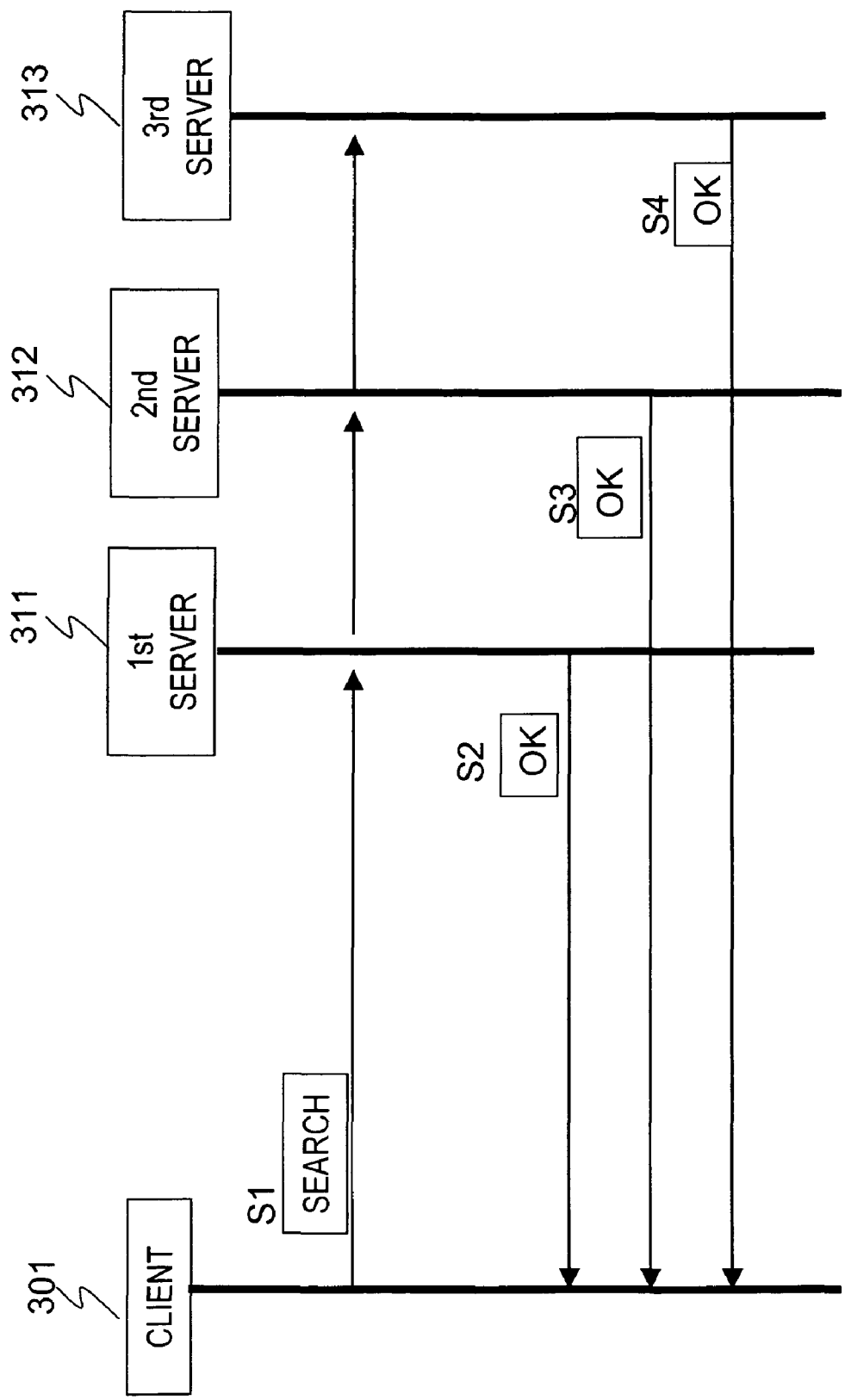
FIG. 3 shows a server discovery processing sequence performed by a client connected to an internal network, such as a home network.

A client connected to the home network 100, that is, an information processing device that wants to obtain content from a server, can obtain information about a service that can be provided by the server by performing a server discovery process of searching for a server on the network, for example, a discovery process defined by the UPnP. FIG. 3 shows a server discovery process sequence performed by a client connected to the home network 100.

A client 301 performs a server discovery process by applying an SSDP (Simple Service Discovery Protocol), which is a protocol for detecting a network service, through the home network. In step S1, the client multicasts (HTTPMU: HTTP-Multicast) a search request in accordance with a UDP (User Datagram Protocol) through the network. A first server 311, a second server 312, and a third server 313 connected to the home network receive the search request from the client, and unicast (HTTPU: HTTPUnicast) an OK response indicating that a service can be provided to the client in accordance with the UDP in steps S2, S3, and S4, respectively. The OK response includes access information to the server and information about a service that can be provided.

The client that has received the OK responses from the respective servers in the discovery process checks information about services that can be provided by the servers, and then performs a service request process of requesting a service to each device based on the information. For example, the client can request the server to transmit content, obtain the content from the server, and output the content through a display or a speaker of the client.

[Content Obtaining Process Performed by a Client Outside the Home Network]

If the above-described typical server discovery process in accordance with the UPnP is performed between an information processing terminal connected to an external network and a server in the home network, content stored in the server connected to the home network may be illegally obtained and used by an unauthorized client that is not permitted to use the content.

In the configuration of the present invention, the application gateway 110 shown in FIG. 1 verifies an access request from a client connected to the external network to a server connected to the internal network, such as the home network, and determines whether the client has an access right. Only when it is determined that the client connected to the external network has an authorized access right, the client is permitted to access the server.

(1) Device Registration Process

An information processing device (mobile device) which accesses the external network outside the home network such as the Internet in order to access a server in the home network needs to perform a device registration process in advance.

That is, the mobile device performs a device registration process to information processing devices including the application gateway in the home network in accordance with a predetermined sequence. In the device registration process, a user needs to operate two devices performing a registration process sequence or check display information such as a password. For example, the device registration process is performed by connecting the both devices (the mobile device and the application gateway) to the home network.

Figure 4:
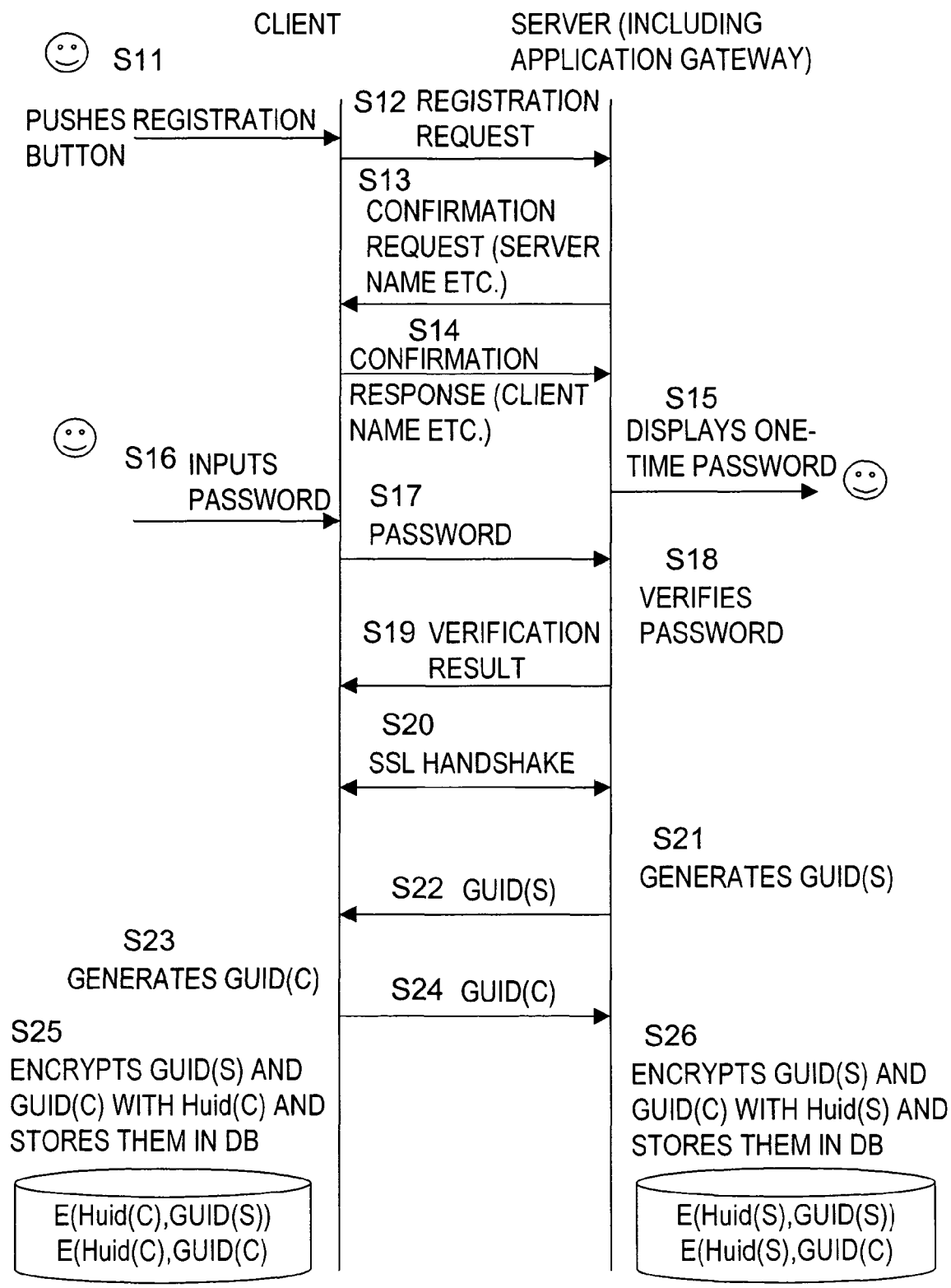
FIG. 4 is a sequence diagram illustrating a procedure of a device registration process of a client connectable to an external network.

Hereinafter, a procedure of the device registration process of the mobile device is described with reference to FIG. 4. In FIG. 4, the left side shows a process performed by a client as the mobile device and the right side shows a process performed by a server as each information processing device including the application gateway in the home network.

First, in step S11, a user pushes a device registration button provided on the client side. Then, in step S12, the client broadcasts a registration request. This step is performed as a multicast transmission in accordance with the UDP (User Datagram Protocol).

After receiving the registration request, the server unicasts a confirmation request to the client in step S13. Hereinafter, a data transmitting/receiving process is performed in accordance with a TCP (Transmission Control Protocol). The confirmation request transmitted from the server to the client includes a name of the server. After receiving the confirmation request, the client transmits a response to the confirmation request to the server in step S14. The response to the confirmation request includes a name of the client.

After receiving the response to the confirmation request, the server displays a message "A one-time password for the client "YYYY" is "**"." to the user in step S15**. That is, the server displays the one-time password on a display of the server. The password is generated by the server by a random number generating process or the like.

The user checks the one-time password and moves from the server side to the client side. The user who has moved to the client side inputs the one-time password displayed in the server through input means of the client in step S16. Then, in step S17, the client transmits the input password to the server.

If the server receives the password from the client within a predetermined time period after displaying the one-time password, the server compares the one-time password generated by the server and displayed to the user in step S15 with the received password in step S18. Then, in step S19, the server notifies the client whether the password has been verified. If the password has not been verified, the process stops. If the password has been verified, the process proceeds to step S20 to shift to an SSL (Secure Socket Layer) handshake process for enabling an encrypted communication process.

In the SSL handshake, the server and the client share secret information that can be applied as a key for encrypted communication. Thereafter, encrypted data can be transmitted/received therebetween by using the shared secret information.

In step S21, the server generates an ID by a random number generating process or the like. The ID preferably should have a global uniqueness and is generated as a bit string of 128 bits or more. The ID generated by the server is regarded as a server ID: GUID(S). GUID stands for a Globally Unique Identifier.

In step S22, the server encrypts the generated server ID: GUID(S) with the key shared by the server and the client by the SSL handshake and transmits the GUID(S) to the client. The client decrypts the received data to obtain the server ID: GUID(S).

On the other hand, the client generates an ID by a random number generating process in step S23. The ID preferably should have a global uniqueness and is generated as a bit string of 128 bits or more. The ID generated by the client is regarded as a client ID: GUID(C).

In step S24, the client encrypts the generated client ID: GUID(C) with the key shared by the server and the client by the SSL handshake and transmits the GUID(C) to the server. The server decrypts the received data to obtain the client ID: GUID(C).

In step S25, the client encrypts the server ID: GUID(S) received from the server and the client ID: GUID(C) generated by the client device and stores them in its storage means. Identification information unique to the hardware of the client device, that is, a hardware unique ID (Huid(C)) is applied as an encryption key. The server ID: GUID(S) and the client ID: GUID(C) are stored as encrypted data in the storage unit.

In this way, the server ID: GUID(S) and the client ID: GUID(C) are encrypted by the hardware unique ID (Huid(C)) and are stored as encrypted data resistant to unauthorized copying and tampering, in other words, as tampering-resistant data.

In step S26, the server encrypts the client ID: GUID(C) received from the client and the server ID: GUID(S) generated in the server device and stores them in its storage means. As in the client, identification information unique to the hardware of the server device, that is, a hardware unique ID (Huid(S)) is applied as an encryption key. In the server, too, the server ID: GUID(S) and the client ID: GUID(C) are stored as encrypted data in the storage unit, so that resistance to unauthorized copying and tampering is ensured.

By performing the above-described process, the mobile device connectable to the external network and each of the servers including the application gateway in the home network share the server ID: GUID(S) and the client ID: GUID (C) as secret information (Secret).

(2) Device Authentication Process

By performing the above-described device registration process, the mobile device holds the server ID: GUID(S) and the client ID: GUID(C) as secret information (Secret) shared with the application gateway. After that, by accessing the external network such as the Internet to access the application gateway 110 shown in FIG. 1 and by performing a predetermined access right determining process sequence, the mobile device can access a server connected to the internal network such as the home network and is permitted to obtain content from the server.

More specifically, the application gateway 110 performs an access right determining process by applying the shared secret information (Secret) including the server ID: GUID(S) and the client ID: GUID(C). If the application gateway 110 determines that the mobile device has an access right, the mobile device is permitted to access a server in the home network.

Figure 5:
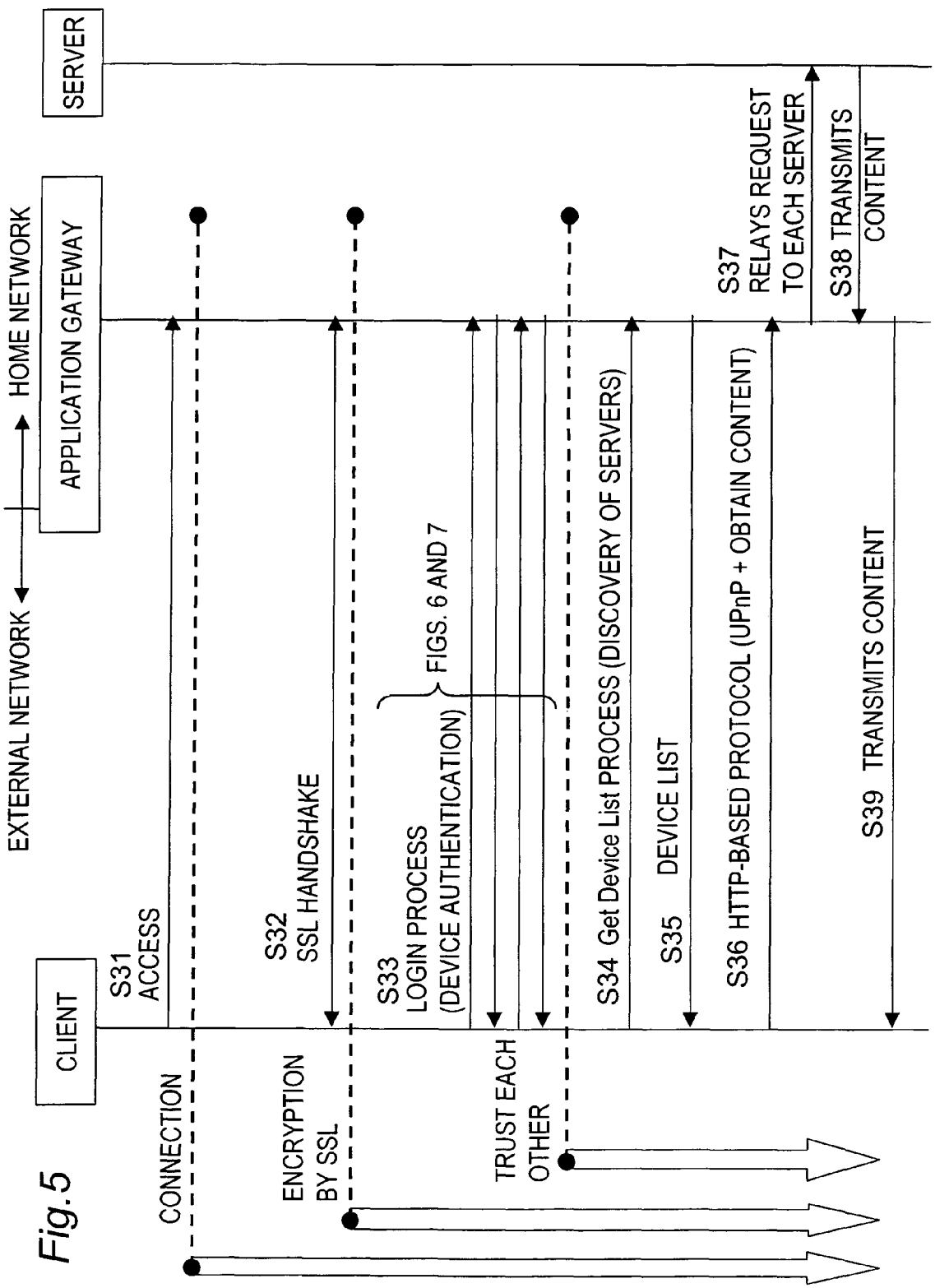
FIG. 5 is a sequence diagram illustrating a procedure of authentication and a content obtaining process performed by the client connected to the external network.

FIG. 5 shows a communication process sequence performed between the mobile device connected to the external network and the application gateway.

In FIG. 5, the client is a client connected to the external network, and the server belongs to the internal network such as the home network. The application gateway exists between the both networks.

In step S31, the client accesses the application gateway. The client needs to obtain an IP address and a port number of the application gateway in order to access the application gateway. For example, the client obtains the IP address and the port number of the application gateway by using a DNS (Domain Name System) server on the network or a service server provided by an ISP (Internet Service Provider) based on a host name or the like set in the application gateway, so as to access the application gateway.

The client does not explicitly perform a process of accessing the application gateway. For example, even if the client tries to directly access a server by using a host name of the server connected to the internal network such as the home network to which the application gateway is connected, the client is connected to the application gateway provided between the external network and the internal network based on setting information of the gateway set in the server. Then, the following device authentication sequence is performed.

The client and the application gateway are connected by a TCP connection in which an HTTP keep alive is set, so that a plurality of HTTP packets can be transmitted/received therebetween while they are connected. Preferably, the following SSL (Secure Socket Layer) handshake process and login process should be sequentially performed in one connection sequence.

In step S32, the client and the application gateway perform the SSL (Secure Socket Layer) handshake process. By performing the SSL handshake, the client and the application gateway share secret information (session key) applicable as a key for encrypted communication. Thereafter, encrypted data can be transmitted/received therebetween by using the shared secret information (session key).

In step S33, the client and the application gateway perform a login process as a device authentication process. Hereinafter, details of the login process are described with reference to FIGS. 6 and 7.

The client having an authorized access right has performed the above-described device registration process, and thus holds the server ID: GUID(S) and the client ID: GUID(C) as secret information (Secret) shared with the application gateway. The server ID: GUID(S) is a server ID generated by the application gateway in the device registration sequence described above with reference to FIG. 4.

Device authentication is performed as a process of mutually confirming that the client and the application gateway share the secret information (Secret), that is, the server ID: GUID(S) and the client ID: GUID(C). The application gateway confirms that the client knows the server ID: GUID(S) and the client ID: GUID(C) stored in the storage unit of the gateway, and authenticates the client after the confirmation. On the other hand, the client confirms that the gateway knows the server ID: GUID(S) and the client ID: GUID(C) stored in the storage unit of the client, and authenticates the gateway after the confirmation.

Figure 6:
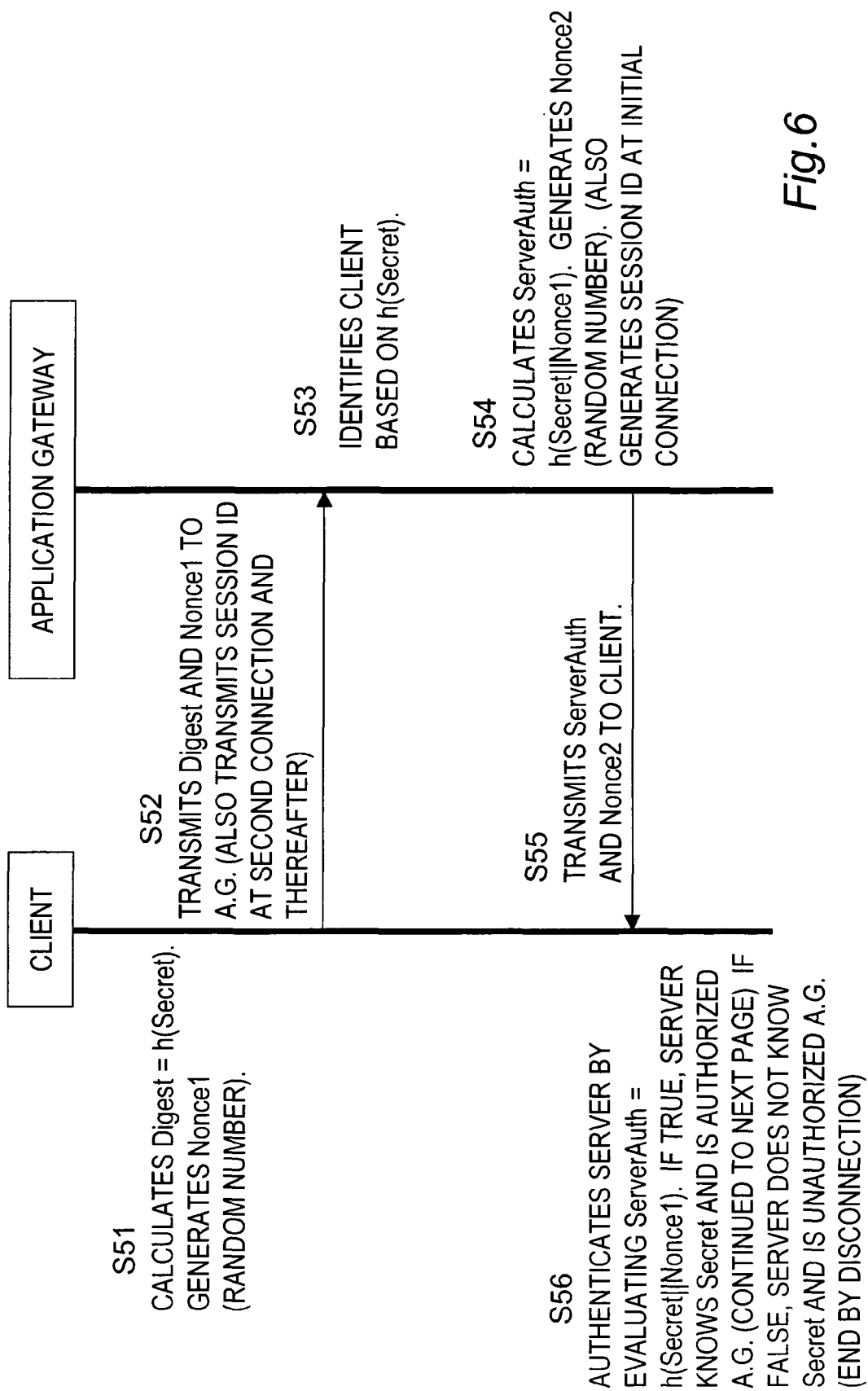
FIG. 6 is a sequence diagram (1) illustrating a procedure of authenticating the client connected to the external network.
Figure 7:
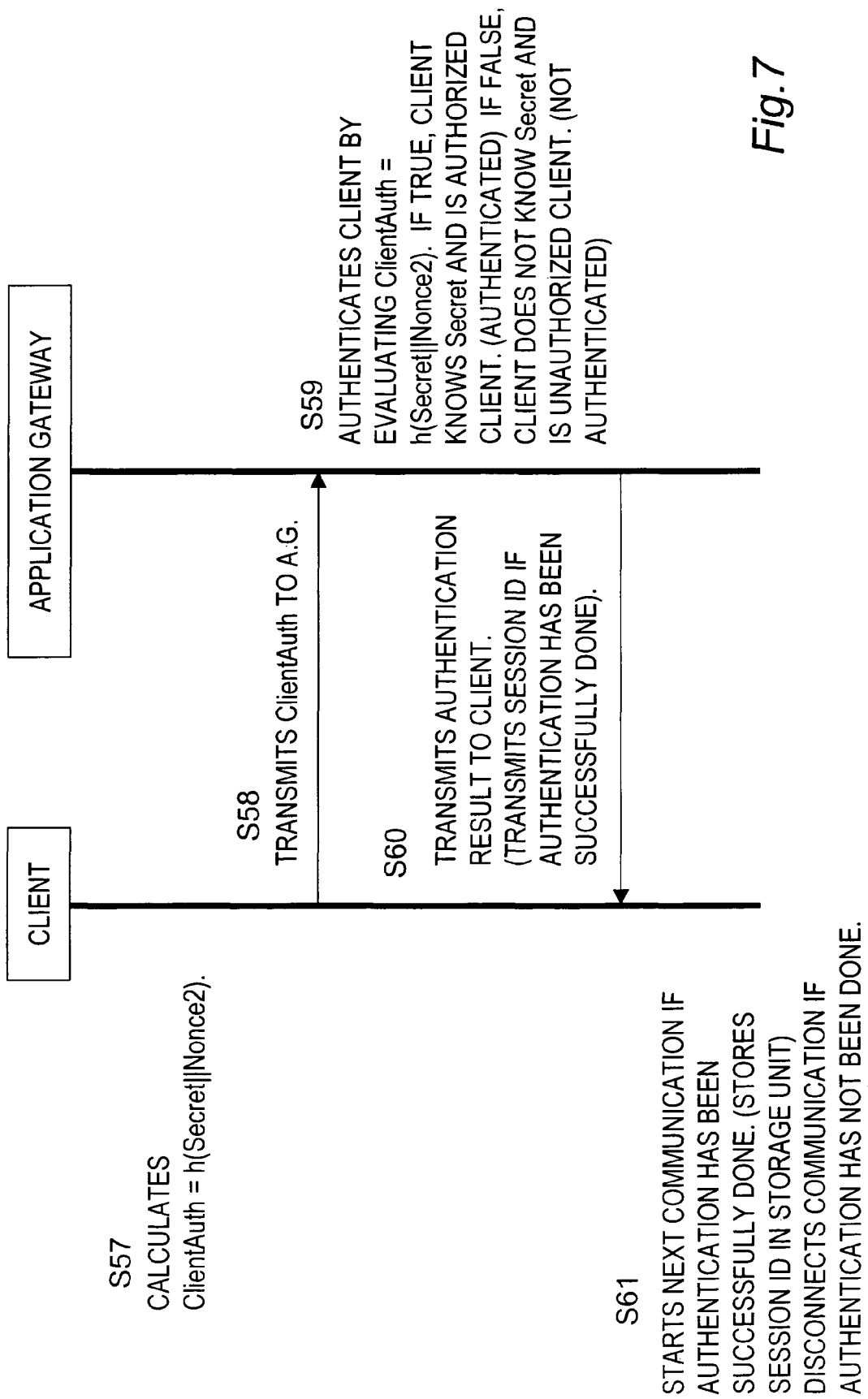
FIG. 7 is a sequence diagram (2) illustrating the procedure of authenticating the client connected to the external network.

In FIGS. 6 and 7, Secret=GUID(C) || GUID(S). A || B indicates coupling of A and B.

First, in step S51 shown in FIG. 6, the client calculates a digest value in accordance with the following expression by applying a hash function (h) as a unidirectional function to Secret=GUID(C) || GUID(S).

$$Digest=h(Secret)$$

Further, the client generates a random number (Nonce1). Incidentally, a function of MD5 or the like can be applied to the hash function.

In step S52, the client transmits the generated digest (Digest) and random number (Nonce1) to the application gateway.

In a state where a connection has already been established between the client and the application gateway and a session is being continued, when authentication is to be performed again, the client transmits a session ID to the application gateway because the client holds the session ID that has been received from the application gateway. At an initial connection, the client does not hold the session ID and thus transmits only the generated digest (Digest) and random number (Nonce1) to the application gateway.

The data transmitted/received between the client and the application gateway in the login process sequence shown in FIGS. 6 and 7 is encrypted by using a key shared by the client and the application gateway in the SSL handshake process in step S32 shown in FIG. 5. Communication between the client and the application gateway is performed as communication through the external network such as the Internet, but security is ensured by encrypted communication.

In step S53, the application gateway identifies the client based on Digest=h(Secret) included in the data received from the client. The application gateway stores a correspondence table (client identifying table) indicating a correspondence between client identifiers and Digest=h(Secret) as shown in FIG. 8 in its storage unit.

The client identifying table is generated in the following way. The application gateway performs a hash value calculating process based on the secret information (Secret) shared with the client, that is, the server ID: GUID(S) and the client ID: GUID(C), in the device registration process described above with reference to FIG. 4. Accordingly, the application gateway generates an entry by associating the hash value with a client identifier, and stores the entry in the storage unit.

In step S54, the application gateway generates a server authentication value (ServerAuth) in accordance with the following expression.

$$ServerAuth=h(Secret || Nonce1)$$

That is, a hash value for combined data including Secret=GUID(C) || GUID(S) and a random number (Nonce1) received from the client is obtained and the hash value is regarded as a server (application gateway) authentication value (ServerAuth). Further, the application gateway generates a random number (Nonce2).

Further, if the application gateway has not received a session ID from the client in step S52 at an initial connection with the client, the application gateway generates a session ID serving as connection identifying information and stores the session ID by associating it with the client identifier.

The application gateway sets an entry for the connected client in a client session ID table shown in FIG. 9, which associates client identifiers with session IDs, and stores the entry in the storage unit.

Accordingly, even when the application gateway is being connected to a plurality of clients of the external network, the application gateway can identify the respective clients based on the session IDs indicated in the client session ID table shown in FIG. 9.

In step S55, the application gateway transmits the server authentication value [ServerAuth=h(Secret || Nonce1)] and the generated random number (Nonce2) to the client.

In step S56, the client compares the server authentication value [ServerAuth=h(Secret || Nonce1)] received from the application gateway with ServerAuth'=h(Secret || Nonce1) generated in the client device. If the both values match, that is, if ServerAuth=ServerAuth' is satisfied, the client determines that the application gateway that is now communicating with the client is the application gateway having the secret information held in the client, that is, secret information identical to Secret=GUID(C) || GUID(S), and that the application gateway is an authorized application gateway sharing the secret information based on the device registration sequence.

On the other hand, if the server authentication value [ServerAuth=h(Secret || Nonce1)] received from the application gateway does not match the ServerAuth'=h(Secret || Nonce1) generated in the client device, the client determines that the application gateway does not have the secret information stored in the client's storage unit, that is, secret information identical to Secret=GUID(C) || GUID(S), and that the application gateway is not the application gateway sharing the secret information based on the device registration sequence but is an unauthorized application gateway. In this case, the client disconnects the communication with the application gateway.

If the application gateway is determined to be an authorized application gateway, the process proceeds to step S57 in FIG. 7.

In step S57 in FIG. 7, the client generates a client authentication value (ClientAuth) in accordance with the following expression.

$$ClientAuth=h(Secret \; || \; Nonce2)$$

That is, the client calculates a hash value for combined data of Secret=GUID(C) || GUID(S) and the random number (Nonce2) received from the application gateway and regards the hash value as the client authentication value (ClientAuth).

In step S58, the client transmits the client authentication value [ClientAuth=h(Secret || Nonce2)] to the application gateway.

In step S59, the application gateway compares the client authentication value [ClientAuth=h(Secret || Nonce2)] received from the client with a ClientAuth'=h(Secret || Nonce2) generated by the application gateway device. If the both values match, that is, if ClientAuth=ClientAuth' is satisfied, the application gateway determines that the client now communicating therewith is the client having the secret information held in the application gateway, that is, secret information identical to Secret=GUID(C) || GUID(S) and that the client is an authorized client sharing the secret information based on the device registration sequence.

On the other hand, if the client authentication value [ClientAuth=h(Secret || Nonce2)] received from the client does not match ClientAuth'=h(Secret || Nonce2) generated in the application gateway, the application gateway determines that the client is a device that does not have the secret information stored in the storage unit of the application gateway, that is, secret information identical to Secret=GUID(C) || GUID(S), and that the client is not a client sharing the secret information based on the device registration sequence but is an unauthorized client.

In step S60, the application gateway transmits an authentication result [OK] or [ERROR] to the client. If the result is [OK], the application gateway also transmits a session ID.

In step S61, if the authentication has been successfully done, the client stores the session ID received from the application gateway in the storage unit, so as to proceed to the next step (e.g., a device list obtaining process in step S34 in FIG. 5). If the authentication has not been successfully done, the client disconnects the communication with the application gateway.

After the above-described process, authentication between the client connected to the external network and the application gateway connected to the internal network such as the home network is completed. If the authentication has been successfully done, the client can obtain information about the server connected to the internal network such as the home network, access the server, and obtain content from the server.

As described above, the device authentication process is performed to mutually confirm that the client and the application gateway share the secret information (Secret), that is, the server ID: GUID(S) and the client ID: GUID(C).

In other words, the application gateway confirms that the client knows the server ID: GUID(S) and the client ID: GUID(C) stored in the storage unit of the gateway, and authenticates the client based on this confirmation. On the other hand, the client confirms that the gateway knows the server ID: GUID(S) and the client ID: GUID(C) stored in the storage unit of the client, and authenticates the gateway based on this confirmation. In this way, after the reliability of each other is ensured by the mutual authentication, the subsequent process can be performed.

(3) Device List Obtaining Process

After the login process between the client connected to the external network and the application gateway has been done and the reliability of both devices has been ensured, the client performs a process of obtaining information about servers in the internal network, such as the home network, to which the application gateway is connected.

If the client is connected within the home network, the device information obtaining process can be performed as a process applying an SSDP (Simple Service Discovery Protocol), which is a network service detection protocol, as described above with reference to FIG. 3. In other words, the client can obtain server information by multicasting (HTTPMU: HTTPMulticast) a search request through the network in accordance with the UDP (User Datagram Protocol) and by receiving OK responses including information about services provided by the servers connected to the home network in accordance with the UDP.

However, the client that is connected to the external network and that communicates with the application gateway cannot obtain information about the servers in the home network through the above-described multicast transmission of the UDP packet.

In that case, a new definition command is used, and the client transmits the new definition command to the application gateway. In response to the received command, the application gateway performs a server discovery process in the home network in accordance with a process applying an SSDP (Simple Service Discovery Protocol). As a result, the application gateway obtains server information and transmits it to the client.

In step S34 shown in FIG. 5, the client transmits a device list obtaining command (Get Device List) as a new definition command to the application gateway. The application gateway performs a server discovery process in the home network based on the received command in accordance with a process applying an SSDP (Simple Service Discovery Protocol). In step S35, the server transmits server information obtained as a result of the SSDP process, that is, a device list, to the client. The device list includes access information to the server and service information that can be provided by the server.

Hereinafter, a device list obtaining (Get Device List) process sequence, which is performed as a server information obtaining process by the client connected to the external network, is described in detail with reference to FIG. 10.

Figure 10:
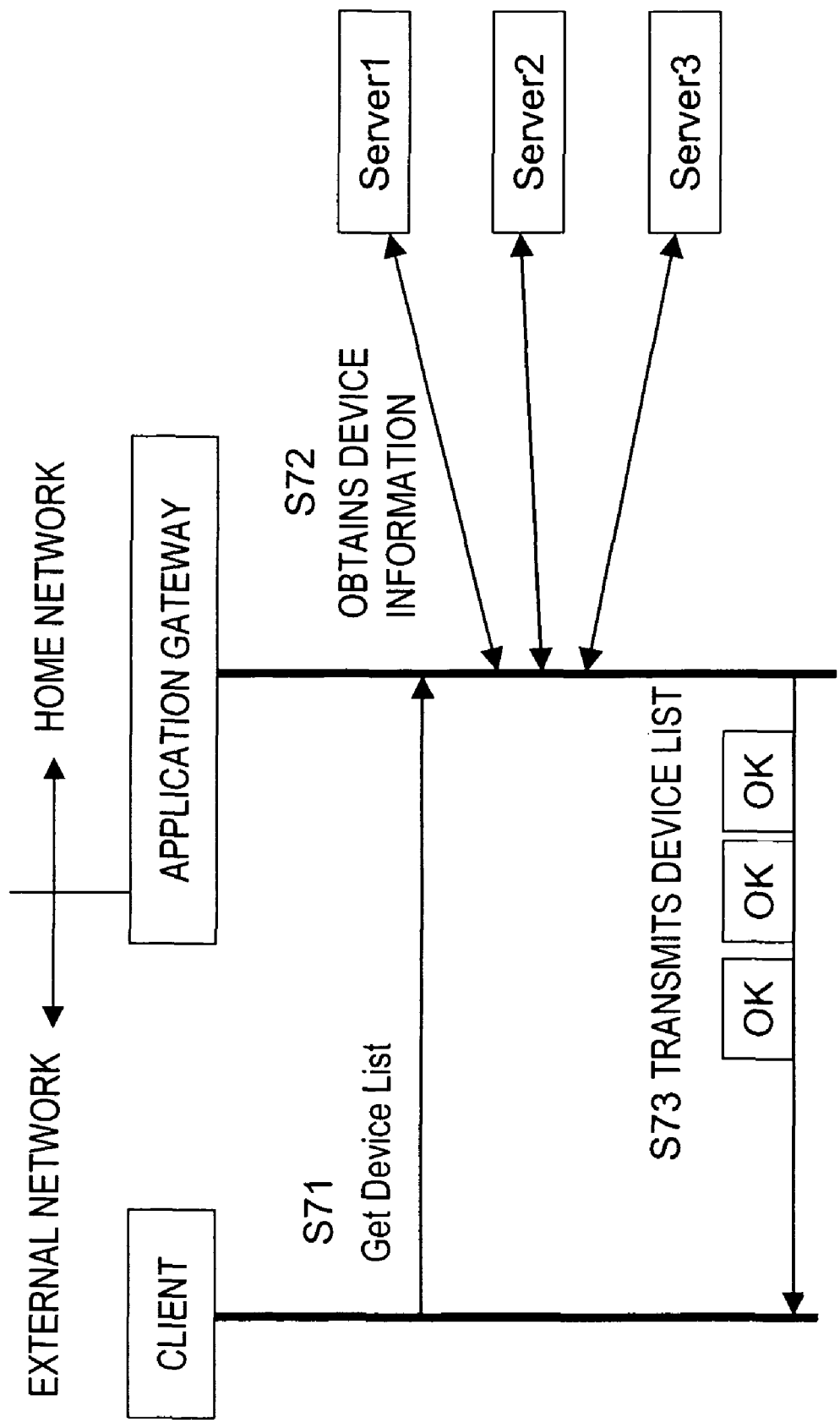
FIG. 10 shows a processing sequence of a device list obtaining request from the client connected to the external network.

In FIG. 10, the client is a client connected to the external network. Servers belong to the internal network such as the home network, and the application gateway exists between both networks. In this case, the above-described login process has been done between the client and the application gateway, and mutual authentication has been successfully done and reliability is ensured.

In step S71, the client transmits a new definition command, that is, a device list obtaining [Get Device List] request command for obtaining server information, to the application gateway.

The application gateway receives the device list obtaining [Get Device List] request command and performs a client identifying process. Then, in step S72, the application gateway performs a device list obtaining process.

Figure 11:
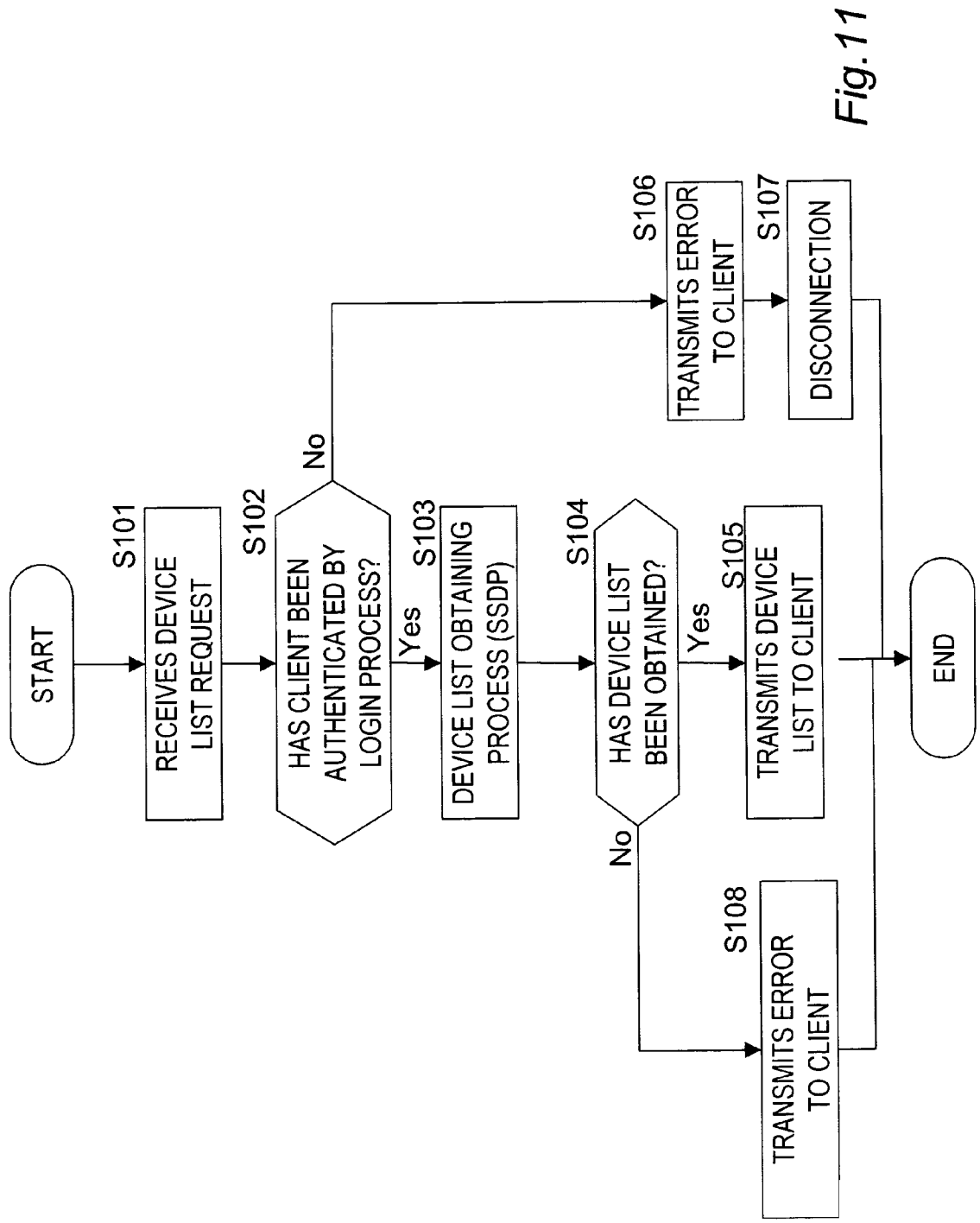
FIG. 11 is a flowchart illustrating a process performed by the application gateway in response to a device list obtaining request from the client connected to the external network.

Now, details of the process performed by the application gateway are described with reference to FIG. 11.

In step S101, the application gateway receives a device list obtaining [Get Device List] request command from the client. Then, the application gateway determines whether the client has been authenticated by the login process. If the client is registered in the client session ID table shown in FIG. 9, which associates client identifiers with session IDs, it is determined that the client has been authenticated by the login process. If the client is not registered in the table, it is determined that the client has not been authenticated by the login process, and thus the process stops and the application gateway transmits an error message to the client in step S106. Then, in step S107, the application gateway disconnects the communication with the client so as to end the process.

If the client that has transmitted the device list obtaining [Get Device List] request command is registered in the client session ID table, the application gateway determines that the client has been authenticated by the login process, and performs a device list obtaining process in step S103.

The device list obtaining process is performed as a process applying an SSDP (Simple Service Discovery Protocol) of the UPnP. That is, the application gateway performs a server discovery process in the internal network such as the home network connected to the application gateway, and receives server information from each server. Specifically, the application gateway multicasts (HTTPMU: HTTPMulticast) a search request through the network in accordance with the UDP (User Datagram Protocol), and receives OK responses including information about services that can be provided from servers connected to the home network in accordance with the UDP.

In step S104, the application gateway determines whether a device list has been successfully obtained. If the device list has not been obtained, the process proceeds to step S108 where the application gateway transmits an error message indicating that the device list has not been obtained to the client.

If the device list has been successfully obtained, the process proceeds to step S105 where the application gateway transmits the obtained device list to the client. More specifically, the application gateway receives information about services that can be provided from respective servers through UDP packets in the home network, stores the service information as a payload of a TCP packet so as to generate a TCP packet, and transmits the TCP packet to the client. The data of the device list is transmitted after encrypted by the secret information (encryption key) shared with the client in the above-described SSL handshake process. The device list includes access information to the servers and service information that can be provided by the servers.

In step S73 shown in FIG. 10, the application gateway transmits a device list to the client after encrypting the device list. The device list includes OK responses received from first to third servers in the home network and indicating that the servers can provide services; and information about services that can be provided by the servers.

In the above-described process, the client receives the OK responses from the respective servers through the application gateway. Then, the client decrypts the received data by using the secret information (encryption key) shared with the application gateway in the above-described SSL handshake process so as to obtain a server list. Accordingly, the client checks access information to the respective servers and information about services that can be provided by the servers. Then, the client performs a service request process of requesting a service to the server based on the information. For example, the client can perform a content transmission request to one of the servers so as to obtain content and to output the content through a display or a speaker of the client.

If the application gateway already has the server information before receiving a device list obtaining [Get Device List] request command from the client, the application gateway may transmit the stored server information to the client in response to the device list obtaining [Get Device List] request command from the client without performing a server discovery process.

As described above, since the client having an authorized access right and connected to the external network can receive information that is totally the same as the server information based on the SSDP (Simple Service Discovery Protocol) applied in the UPnP through the application gateway. Therefore, the client can request a service to a server in the same environment as in a client inside the home network.

After obtaining the device list, the client performs a content obtaining request to the server in step S36 shown in FIG. 5. The content obtaining process to the server can be performed as a process of transmitting an HTTP (Hyper Text Transfer Protocol) GET method request specifying the URL of content included in the obtained server information.

In step S37, the application gateway relays the content request to the server and transmits a packet to the server. More specifically, the gateway receives a packet from the client, establishes a connection with an IP address and a port number of the device written in a HOST header value of the received packet, and relays the packet without changing the content of the packet. Accordingly, the client connected to the external network can communicate with each server connected to the internal network and each server can provide a service to the client without changing a conventionally used protocol.

After the server receives the content request, the server obtains the specified content from the storage means in the server and transmits it to the client. The content is transmitted to the client through the application gateway (steps S38 and S39). Accordingly, the client can play back the content received from the server through a display or a speaker of the client.

[Functional Configuration of the Application Gateway and the Client]

The hardware configuration of the application gateway, the client, and the server has been described above with reference to FIG. 2. The above-described various processes are performed by the CPU serving as a control unit in accordance with a program stored in the storage unit of each of the application gateway, the client, and the server.

The processes performed by the CPU in the application gateway include: a device registration process and a device authentication process (login process) based on an input of a request from a client, analysis of the input information, and an analysis result; a server discovery process in accordance with an SSDP; a packet relay process; a packet generating and analyzing process; a process of outputting various messages including a password in the device registration process; and a process of analyzing user input information. The processes performed on the client side include: a process of analyzing information received from the application gateway; a process of generating and analyzing a packet transmitted/received to/from the application gateway; a device registration process; a device authentication process, a process of outputting a message; a process of analyzing user input information; and a content playback process.

Figure 12:
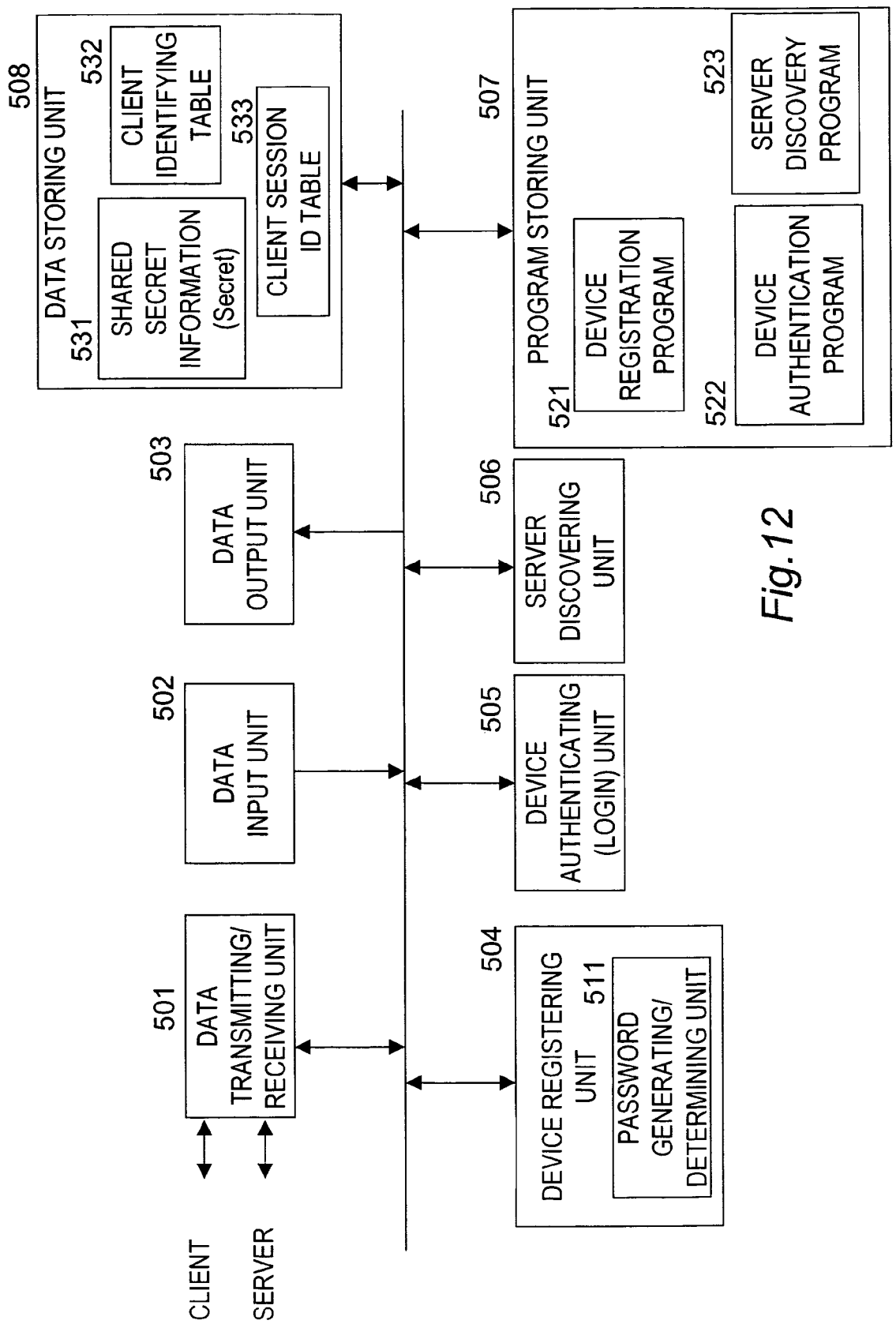
FIG. 12 is a block diagram illustrating a functional configuration of the application gateway.

Basically, these processes are performed in accordance with a processing program stored in advance under control by the CPU serving as a control unit provided in each of the application gateway and the client device. Among the processes performed by the CPU serving as a control unit and data stored in the storage unit, a main configuration related to the present invention is described below with reference to FIGS. 12 and 13. FIG. 12 is a block diagram illustrating a main functional configuration of the application gateway; and FIG. 13 is a block diagram illustrating a main functional configuration of the client.

First, the functional configuration of the application gateway is described with reference to the block diagram shown in FIG. 12. A data transmitting/receiving unit 501 transmits/receives packets to/from the client and the server. Also, the data transmitting/receiving unit 501 generates a transmitted packet and analyzes a received packet. These processes include, for example, setting an address of a packet, recognizing an address, storing data in a data unit, and obtaining data from the data unit.

A data input unit 502 inputs information from input means, such as a keyboard or a switch, to each processing unit. A data output unit 503 outputs an output signal from each processing unit to a display or a speaker as an external output unit.

A device registering unit 504 performs a processing sequence based on a device registration request from the client. In the sequence described above with reference to FIG. 4, the device registering unit 504 performs a process on the application gateway side in accordance with a device registration program 521 stored in a program storing unit 507. Further, the device registering unit 504 includes a password generating/determining unit 511 so as to generate and verify a password.

A device authenticating unit 505 performs device authentication when receiving an access request from a client connected to the external network. More specifically, the device authenticating unit 505 performs the process on the application gateway side in the device authentication process (login process) described above with reference to FIGS. 5 to 7 in accordance with a device authentication program 522 stored in the program storing unit 507. Also, the device authenticating unit 505 performs an SSL (Secure Socket Layer) handshake process as an encryption key sharing process.

A server discovering unit 506 performs a server discovery process in accordance with the SSDP in response to a device list request from a client and transmits the obtained server list to the client. More specifically, the server discovering unit 506 performs the process on the application gateway side described above with reference to FIGS. 10 and 11 in accordance with a server discovery program 523 stored in the program storing unit 507.

The program storing unit 507 stores programs performed by each of the above-described processing units: the device registration program 521; the device authentication program 522; and the server discovery program 523.

A data storing unit 508 stores shared secret information (Secret) 531 generated in the device registration process performed with the client, that is, data generated by encrypting Secret=GUID(C) || GUID(S) with a hardware unique ID (Huid(S)); a client identifying table 532 (see FIG. 8) generated in the device registration process performed with the client; and a client session ID table 533 (see FIG. 9) for identifying a session in which a mutual authentication with a client has been done and a relationship of trust with the client has been established.

The block diagram shown in FIG. 12 is a functional block diagram mainly showing functions for performing the processes related to the present invention among processes performed by the application gateway. The application gateway holds other various processing programs and performs various processes in accordance with the respective processing programs.

Next, a functional configuration of the client is described with reference to FIG. 13. A data transmitting/receiving unit 601 transmits/receives packets to/from the application gateway and the server. Also, the data transmitting/receiving unit 601 generates a transmitted packet and analyzes a received packet. These processes include, for example, setting an address of a packet, recognizing an address, storing data in a data unit, and obtaining data from the data unit.

A data input unit 602 inputs information from input means, such as a keyboard or a switch, to each processing unit. A data output unit 603 outputs an output signal from each processing unit to a display or a speaker as an external output unit.

A device registering unit 604 performs a device registration processing sequence which is performed between the client and the application gateway or another device. Specifically, the device registering unit 604 performs the process on the client side in the process described above with reference to FIG. 4 in accordance with a device registration program 621 stored in a program storing unit 607.

A device authenticating unit 605 performs device authentication when the client connected to the external network accesses the application gateway. More specifically, the device authenticating unit 605 performs the process on the client side in the device authentication process (login process) described above with reference to FIGS. 5 to 7 in accordance with a device authentication program 622 stored in the program storing unit 607. Also, the device authenticating unit 605 performs an SSL (Secure Socket Layer) handshake process as an encryption key sharing process.

A device list requesting unit 606 generates a device list request to be transmitted to the application gateway and obtains a device list. Specifically, the device list requesting unit 606 performs the process on the client side in the process described above with reference to FIG. 10 in accordance with a device list request program 623 stored in the program storing unit 607.

The program storing unit 607 stores programs performed in the above-described processing units: the device registration program 621; the device authentication program 622; and the device list request program 623.

A data storing unit 608 stores shared secret information (Secret) 631 generated in the device registration process performed with the application gateway, that is, data generated by encrypting Secret=GUID(C) || GUID(S) with a hardware identifier (Huid(C)); and a session ID 632 obtained from the application gateway after authentication with the application gateway has been done.

The block diagram shown in FIG. 13 is a functional block diagram mainly showing functions for performing the processes related to the present invention among processes performed by the client. The client holds other various processing programs and performs various processes in accordance with the respective processing programs.

The present invention has been described in detail with reference to the specific embodiment. Those skilled in the art can obviously carry out modifications and substitutes of the embodiment without deviating from the scope of the present invention. That is, the present invention is disclosed in a form of an example and should not be limitedly interpreted. The claims should be considered in order to determine the scope of the present invention.

The series of processes described in this description can be performed by any of hardware, software, and a composite configuration of hardware and software. When the processes are performed by software, a program of the processing sequence can be performed after installing it in a memory of a computer incorporated into dedicated hardware or installing it in a general-purpose computer capable of performing various processes.

For example, the program can be recorded in advance in a hard disk or a ROM (Read Only Memory) as a recording medium. Alternatively, the program can be temporarily or permanently stored (recorded) in a removable recording medium, such as a flexible disk, a CD-ROM (Compact Disc Read Only Memory), an MO (Magneto Optical) disk, a DVD (Digital Versatile Disc), a magnetic disk, or a semiconductor memory. The removable recording medium can be provided as so-called packaged software.

The program can be installed from the above-described removable recording medium to a computer. Alternatively, the program can be wirelessly transferred from a download site to the computer or transferred in a wired manner through a network such as a LAN (Local Area Network) or the Internet. The computer can receive the program transmitted in this way and install the program in a recording medium in the computer, such as a hard disk.

The various processes described in this description may be performed in time series in accordance with the described order. Alternatively, the processes may be performed in parallel or individually depending on the ability of a device performing the process or as necessary. In this description, a system is a logical group of a plurality of devices, and the devices having different configurations do not always placed in the same casing.

INDUSTRIAL APPLICABILITY

As described above, according to the present invention, both the client device connectable to the external network and the application gateway store the shared secret information (Secret) including the ID generated by the client, the client ID: GUID(C), and the ID generated by the application gateway, the server ID: GUID(S), in their storage units. When the application gateway receives an access request from the client, the application gateway determines whether the client has proper shared secret information (Secret) in order to determine whether the client has an access right. With this configuration, a right determining process can be efficiently and appropriately performed on an access from the external network to the internal network in a local area, such as a home network.

Further, in the configuration of the present invention, both the client device and the application gateway mutually determine whether the other side holds the shared secret information (Secret), that is, the client ID: GUID(C) and the server ID: GUID(S), so as to verify the right of each other. Therefore, an access to the internal network is refused if any one of them is unauthorized, so that security against external accesses to the internal network can be enhanced.

Further, according to the configuration of the present invention, the application gateway holds the client session ID table in which client identifiers are associated with session IDs serving as connection identification information with clients. With this configuration, each client can be identified by the session ID even when a plurality of clients access from the external network.

Further, according to the configuration of the present invention, an encryption key sharing process applied to encrypted communication with the client is performed before starting an access right determining process of determining whether the client has the shared secret information (Secret). That is, whether the client has the shared secret information (Secret) is determined by encrypting transmitted/received data based on an encryption key. With this configuration, a high-security access right determining process can be realized even in a communication through a network having a risk of tapping, such as the Internet.

Further, according to the configuration of the present invention, in a device registration process of performing a process of sharing the client ID: GUID(C) and the server ID: GUID(S), a password is authenticated before exchanging IDs and the IDs are exchanged through the network after encrypting the IDs. With this configuration, the device registration process is securely performed in a specific closed network, and thus an improper device registration can be prevented.

The invention claimed is:

1. An information processing device performing an access control process, the information processing device comprising:
   a data transmitting/receiving unit configured to transmit/receive data to/from a client serving as an access requesting device;
   a memory configured to store shared secret information shared with a client having a proper access right, the shared secret information including both a client ID as an ID generated by the client having the proper access right and a server ID as an ID generated by the information processing device; and
   a device authenticating processing unit configured to receive a random number generated by a client requesting access and a digest value including a hash of the shared secret information from the client requesting access and determine whether the client requesting access has an access right by identifying whether the digest value includes the shared secret information in response to an access request from the client requesting access.

2. The information processing device according to claim 1, wherein
   the memory is further configured to store the shared secret information including both the client ID and the server ID as encrypted data encrypted by a hardware unique ID unique to hardware of the information processing device.

3. The information processing device according to claim 1, wherein
   the device authenticating unit processing is further configured to
      receive a client authentication value including a hash of a self-generated random number coupled with the shared secret information from the client requesting access,
      calculate a corresponding self-generated client authentication value including a hash of the self-generated random number coupled with the shared secret information stored in the memory,
      compare the client authentication value with the self-generated client authentication value, and determine that the client requesting access has an access right when the client authentication value and the self-generated client authentication value match.

4. The information processing device according to claim 1, wherein
the device authenticating unit processing is further configured to
calculate a server authentication value including a hash of the random number from the client requesting access and the shared secret information stored in the memory, and
transmit the server authentication value to the client requesting access.

5. The information processing device according to claim 1, wherein
the information processing device further comprises a client identifying table in which client identifiers are associated with hash values of the shared secret information, and
the device authenticating unit is further configured to identify the client requesting access by searching the client identifying table based on a hash of shared secret information received from the client requesting access.

6. The information processing device according to claim 1, wherein
the information processing device further comprises a client session ID table in which client identifiers are associated with session IDs serving as connection identification information and
the device authenticating unit is further configured to identify the client requesting access by searching the client session ID table based on a session ID.

7. The information processing device according to claim 1, wherein
the device authenticating processing unit is further configured to perform an encryption key sharing process with the client requesting access before determining whether the client requesting access has the access right, so as to determine whether the client requesting access has the access right by encrypted data communication based on the encryption key.

8. The information processing device according to claim 7, wherein
the encryption key sharing process is an SSL (Secure Socket Layer) handshake process.

9. The information processing device according to claim 1, further comprising:
a device registering processing unit configured to perform a process of sharing the shared secret information including the client ID and the server ID with the client having the proper access right, wherein
the device registering processing unit is further configured to perform an ID exchange process of exchanging the client ID as an ID generated by the client having the proper access right and the server ID as an ID generated by the information processing device by encrypted data communication through a network.

10. The information processing device according to claim 9, wherein
the device registering processing unit is further configured to perform a password authentication process in order to perform the ID exchange process.

11. The information processing device according to claim 1, wherein
each of the client ID and the server ID included in the shared secret information has a global uniqueness.

12. The information processing device according to claim 1, wherein
the information processing device is an application gateway positioned between an internal local area network and an external network outside the local area network.

13. The information processing device according to claim 1, wherein
the information processing device is a reverse proxy server positioned between an internal local area network and an external network outside the local area network.

14. An information processing device serving as a client performing an access request process, the information processing device comprising:
a data transmitting/receiving unit configured to transmit/receive data to/from an application gateway;
a memory configured to store shared secret information shared with the application gateway, the shared secret information including both a client ID as an ID generated by the information processing device and a server ID as an ID generated by the application gateway; and
a device authenticating processing unit configured to receive a random number generated by the application gateway and a server authentication value including a hash of the shared secret information from the application gateway and determine whether the application gateway is authorized by identifying whether the server authentication value includes the shared secret information.

15. The information processing device according to claim 14, wherein
the memory is further configured to store the shared secret information including both the client ID and the server ID as encrypted data encrypted by a hardware unique ID unique to hardware of the information processing device.

16. The information processing device according to claim 14, wherein
the server authentication value includes a self-generated random number, and the device authenticating processing unit is further configured to
calculate a corresponding self-generated server authentication value including a hash of the self-generated random number coupled with the shared secret information stored in the memory,
compare the sever authentication value with the self-generated server authentication value, and
determine that the application gateway is authorized when the server authentication value and the self-generated server authentication value match.

17. The information processing device according to claim 14, wherein
the device authenticating processing unit is further configured to
calculate a client authentication value including a hash of the random number generated by the application gateway and the shared secret information stored in the memory, and
transmit the client authentication value to the application gateway.

18. The information processing device according to claim 14, wherein
the device authenticating processing unit is further configured to perform an encryption key sharing process with the application gateway before determining whether the application gateway is authorized, so as to determine whether the application gateway is authorized by encrypted data communication based on the encryption key.

19. The information processing device according to claim 18, wherein
the encryption key sharing process is an SSL (Secure Socket Layer) handshake process.

20. The information processing device according to claim 14, further comprising:
a device registering processing unit configured to perform a process of sharing the shared secret information including the client ID and the server ID with the application gateway, wherein
the device registering processing unit is further configured to perform an ID exchange process of exchanging the client ID as an ID generated by the information processing device and the server ID as an ID generated by the application gateway by encrypted data communication through a network.

21. The information processing device according to claim 20, wherein
the device registering processing unit is further configured to perform a password authentication process in order to perform the ID exchange process.

22. The information processing device according to claim 14, wherein
each of the client ID and the server ID included in the shared secret information has a global uniqueness.

23. A server-client system including an application gateway performing an access control process and a client performing a process to request access to the application gateway, comprising:
the application gateway including
a server data transmitting/receiving unit configured to transmit/receive data,
a server memory configured to store shared secret information shared with a client having a proper access right, the shared secret information including both a client ID as an ID generated by the client having the proper access right and a server ID as an ID generated by the application gateway, and
a server device authenticating processing unit configured to receive a random number generated by a client requesting access and a digest value including a hash of the shared secret information from the client requesting access and determine whether the client requesting access has an access right by identifying whether the digest value includes the shared secret information in response to an access request from the client requesting access; and
the client having the proper access right including
a client data transmitting/receiving unit configured to transmit/receive data,
a client memory configured to store the shared secret information shared with the application gateway, and
a client device authenticating processing unit configured to determine whether the application gateway is authorized by determining whether the application gateway has the shared secret information.

24. The server-client system according to claim 23, wherein
the server memory is further configured to store the shared secret information including both the client ID and the server ID as encrypted data encrypted by a hardware unique ID unique to hardware of the server.

25. The server-client system according to claim 23, wherein
the server device authenticating processing unit is further configured to
receive a client authentication value including a hash of a random number generated by the application gateway coupled with the shared secret information from the client requesting access,
calculate a corresponding self-generated client authentication value including a hash of the random number generated by the application gateway coupled with the shared secret information stored in the server memory,
compare the client authentication value with the self-generated client authentication value, and
determine that the client requesting access has an access right when the client authentication value and the self-generated client authentication value match.

26. The server-client system according to claim 23, wherein
the server device authenticating processing unit is further configured to
calculate a server authentication value including a hash of the random number from the client requesting access and the shared secret information stored in the server memory, and
transmit the server authentication value to the client requesting access.

27. The server-client system according to claim 23, wherein
the client memory is further configured to store the shared secret information including both the client ID and the server ID as encrypted data encrypted by a hardware unique ID unique to hardware of the client having the proper access right.

28. The server-client system according to claim 23, wherein
the client device authenticating processing unit is further configured to
receive a server authentication value including a hash of a random number generated by the client having the proper access right coupled with the shared secret information stored in the server memory,
calculate a corresponding self-generated server authentication value including a hash of the random number generated by the client having the proper access right coupled with the shared secret information stored in the client memory,
compare the sever authentication value with the self-generated server authentication value, and
determine that the application gateway is authorized when the server authentication value and the self-generated server authentication value match.

29. The server-client system according to claim 23, wherein
the client device authenticating processing unit is further configured to
receive a random number generated by the application gateway,
calculate a client authentication value including a hash of the random number generated by the application gateway and the shared secret information stored in the client memory, and
transmit the client authentication value to the application gateway.

30. An access control processing method in an information processing device, the access control processing method comprising:
- storing shared secret information shared with a client having a proper access right, the shared secret information including both a client ID generated by the client having the proper access right and a server ID generated by the information processing device;
- receiving a random number generated by a client requesting access and a digest value including a hash of the shared secret information from the client requesting access; and
- determining, by a process executing on a processor, whether the client requesting access has an access right by identifying whether the digest value includes the shared secret information in response to an access request from the client requesting access.

31. The access control processing method according to claim 30, wherein determining whether the client requesting access has the access right further includes
- receiving a client authentication value including a hash of a self-generated random number coupled with the shared secret information from the client,
- calculating a corresponding self-generated client authentication value including a hash of the self-generated random number coupled with the shared secret information,
- comparing the client authentication value with the self-generated client authentication value, and
- determining that the client requesting access has an access right when the client authentication value and the self-generated client authentication value match.

32. The access control processing method according to claim 30, wherein determining whether the client requesting access has the access right further includes
- calculating a server authentication value including a hash of the random number from the client requesting access and the shared secret information, and
- transmitting the server authentication value to the client requesting access.

33. The access control processing method according to claim 30, further comprising:
- performing a table search based on the hash of the shared secret information by using a client identifying table in which client identifiers are associated with hash values of the shared secret information, so as to identify the client requesting access.

34. The access control processing method according to claim 30, further comprising:
- performing a table search based on a session ID received from the client requesting access by using a client session ID table in which client identifiers are associated with session IDs serving as connection identification information, so as to identify the client requesting access.

35. The access control processing method according to claim 30, wherein
- an encryption key sharing process is performed with the client requesting access before the determining whether the client requesting access has the access right, and
- the determining whether the client requesting access has the access right is further performed by encrypted data communication based on the encryption key.

36. The access control processing method according to claim 35, wherein
- the encryption key sharing process is an SSL (Secure Socket Layer) handshake process.

37. The access control processing method according to claim 30, further comprising:
- a device registering process of sharing the shared secret information including the client ID and the server ID with the client having the proper access right, wherein
- the device registering process further performs an ID exchange process of exchanging the client ID as an ID generated by the client having the proper access right and the server ID as an ID generated by the information processing device by encrypted data communication through a network.

38. The access control processing method according to claim 37, wherein
- the device registering process further includes a step of performing a password authentication process in order to perform the ID exchange process.

39. The access control processing method according to claim 30, wherein
- each of the client ID and the server ID included in the shared secret information has a global uniqueness.

40. An information processing method in an information processing device serving as a client performing an access request process, the information processing method comprising:
- storing shared secret information shared with an application gateway, the shared secret information including both a client ID generated by the information processing device and a server ID generated by the application gateway;
- accessing the application gateway;
- receiving a random number generated by the application gateway and a server authentication value including a hash of the shared secret information from the application gateway; and
- determining, by a process executing on a processor, whether the application gateway is authorized by identifying whether the server authentication value includes the shared secret information.

41. The information processing method according to claim 40, wherein
- the server authentication value includes a self-generated random number, and
- determining whether the application gateway is authorized further includes
- calculating a corresponding self-generated server authentication value including a hash of the self-generated random number coupled with the shared secret information,
- comparing the sever authentication value with the self-generated server authentication value, and
- determining that the application gateway is authorized when the server authentication value and the self-generated server authentication value match.

42. The information processing method according to claim 40, wherein determining whether the authentication gateway is authorized further includes
- calculating a client authentication value including a hash of the random number generated by the application gateway and the shared secret information, and
- transmitting the client authentication value to the application gateway.

43. The information processing method according to claim 40, wherein
- an encryption key sharing process is performed with the application gateway before the determining whether the application gateway is authorized, and the determining whether the application gateway is authorized is further performed by encrypted data communication based on the encryption key.

44. The information processing method according to claim 43, wherein
the encryption key sharing process is an SSL (Secure Socket Layer) handshake process.

45. The information processing method according to claim 40, further comprising:
a device registering process of sharing the shared secret information including the client ID and the server ID with the application gateway, wherein
the device registering process further performs an ID exchange process of exchanging the client ID as an ID generated by the information processing device and the server ID as an ID generated by the application gateway by encrypted data communication through a network.

46. The information processing method according to claim 45, wherein
the device registering process further performs a password authentication process in order to perform the ID exchange process.

47. The information processing method according to claim 40, wherein
each of the client ID and the server ID included in the shared secret information has a global uniqueness.

48. A non-transitory computer-readable storage medium storing a computer program that, when executed by a computer, directs the computer to perform an access control process in an information processing device, the access control process comprising:
storing shared secret information shared with a client having a proper access right, the shared secret information including both a client ID generated by the client having the proper access right and a server ID generated by the information processing device;
receiving a random number generated by a client requesting access and a digest value including a hash of the shared secret information from the client requesting access; and
determining whether the client requesting access has an access right by identifying whether the digest value includes the shared secret information in response to an access request from the client requesting access.

49. A non-transitory computer-readable storage medium storing a computer program that, when executed by a computer, directs the computer to perform information processing in an information processing device serving as a client performing an access request process, the access request process comprising:
storing shared secret information shared with an application gateway, the shared secret information including both a client ID generated by the information processing device and a server ID generated by the application gateway;
accessing the application gateway;
receiving a random number generated by the application gateway and a server authentication value including a hash of the shared secret information from the application gateway; and
determining whether the application gateway is authorized by identifying whether the server authentication value includes the shared secret information.

* * * * *